Oct. 13, 1942.   P. M. NEJEDLY   2,298,718
BOWLING PIN SETTING MACHINE CONTROL MECHANISM
Filed June 7, 1940    11 Sheets-Sheet 4
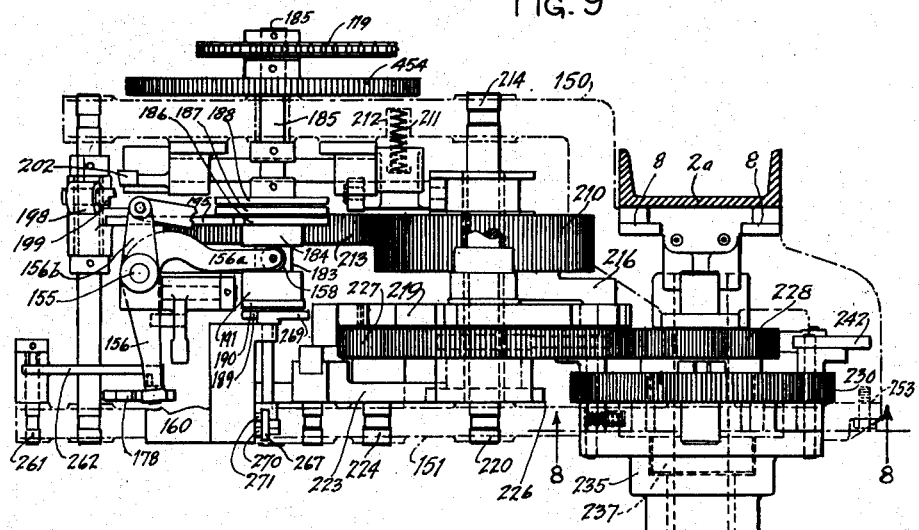
Fig. 9
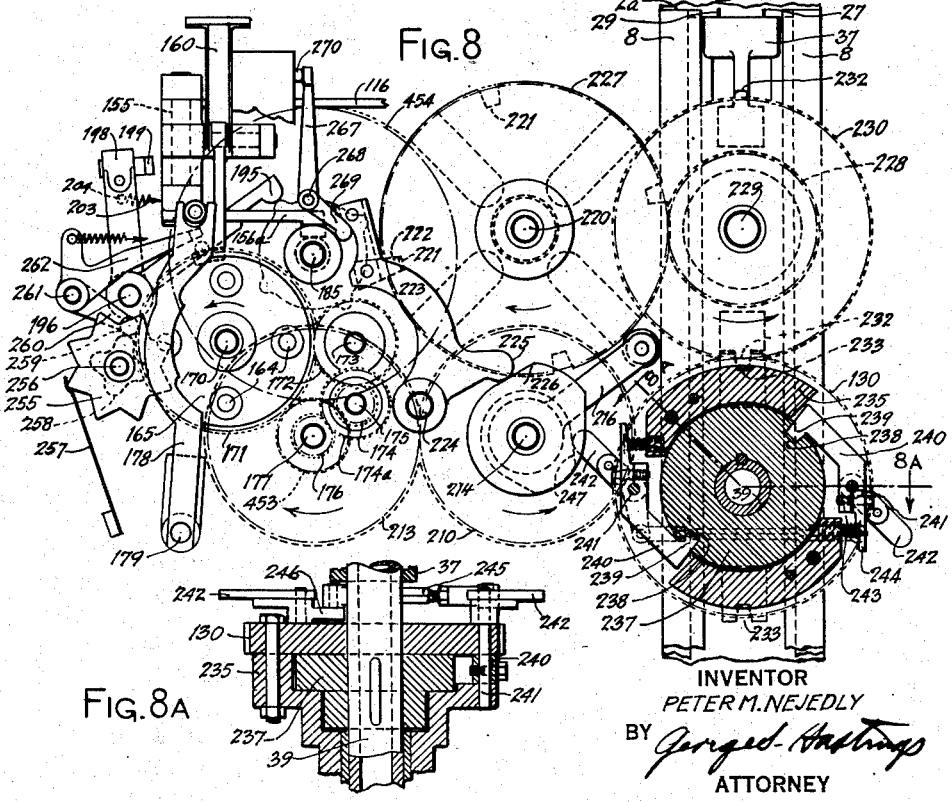
Fig. 8
Fig. 8A
INVENTOR
PETER M. NEJEDLY
BY *George J. Anstrup*
ATTORNEY Oct. 13, 1942. P. M. NEJEDLY 2,298,718
BOWLING PIN SETTING MACHINE CONTROL MECHANISM
Filed June 7, 1940 11 Sheets-Sheet 5
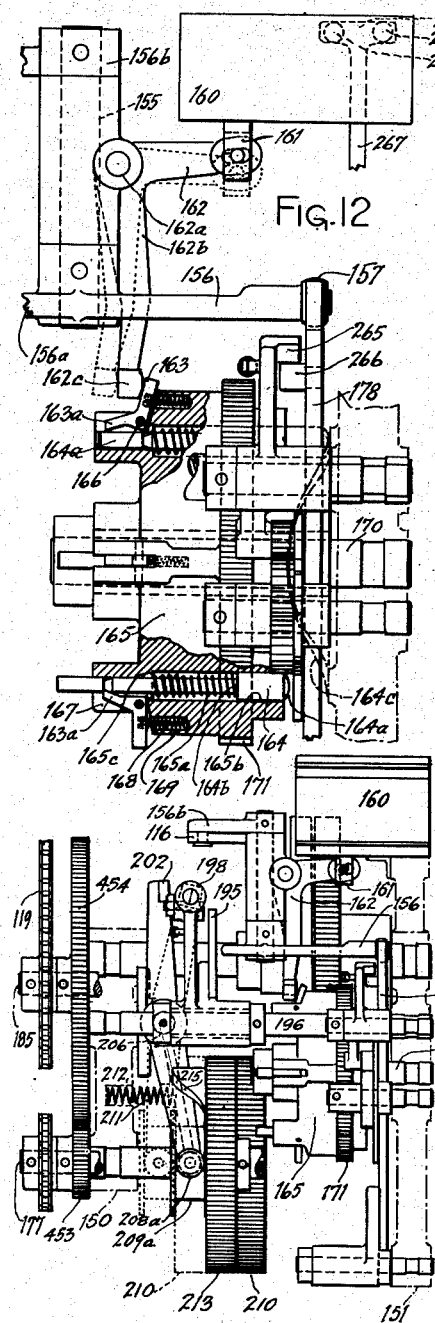
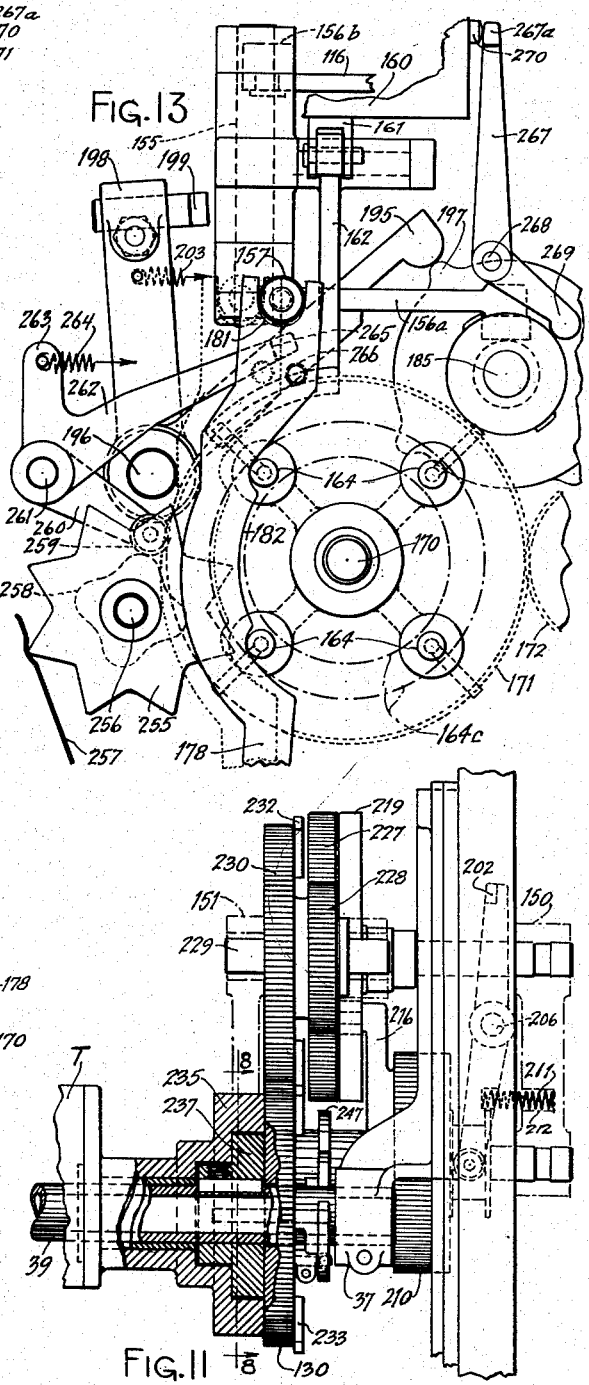
INVENTOR
PETER M. NEJEDLY
BY George S. Hastings
ATTORNEY Oct. 13, 1942.  P. M. NEJEDLY  2,298,718
BOWLING PIN SETTING MACHINE CONTROL MECHANISM
Filed June 7, 1940  11 Sheets-Sheet 6
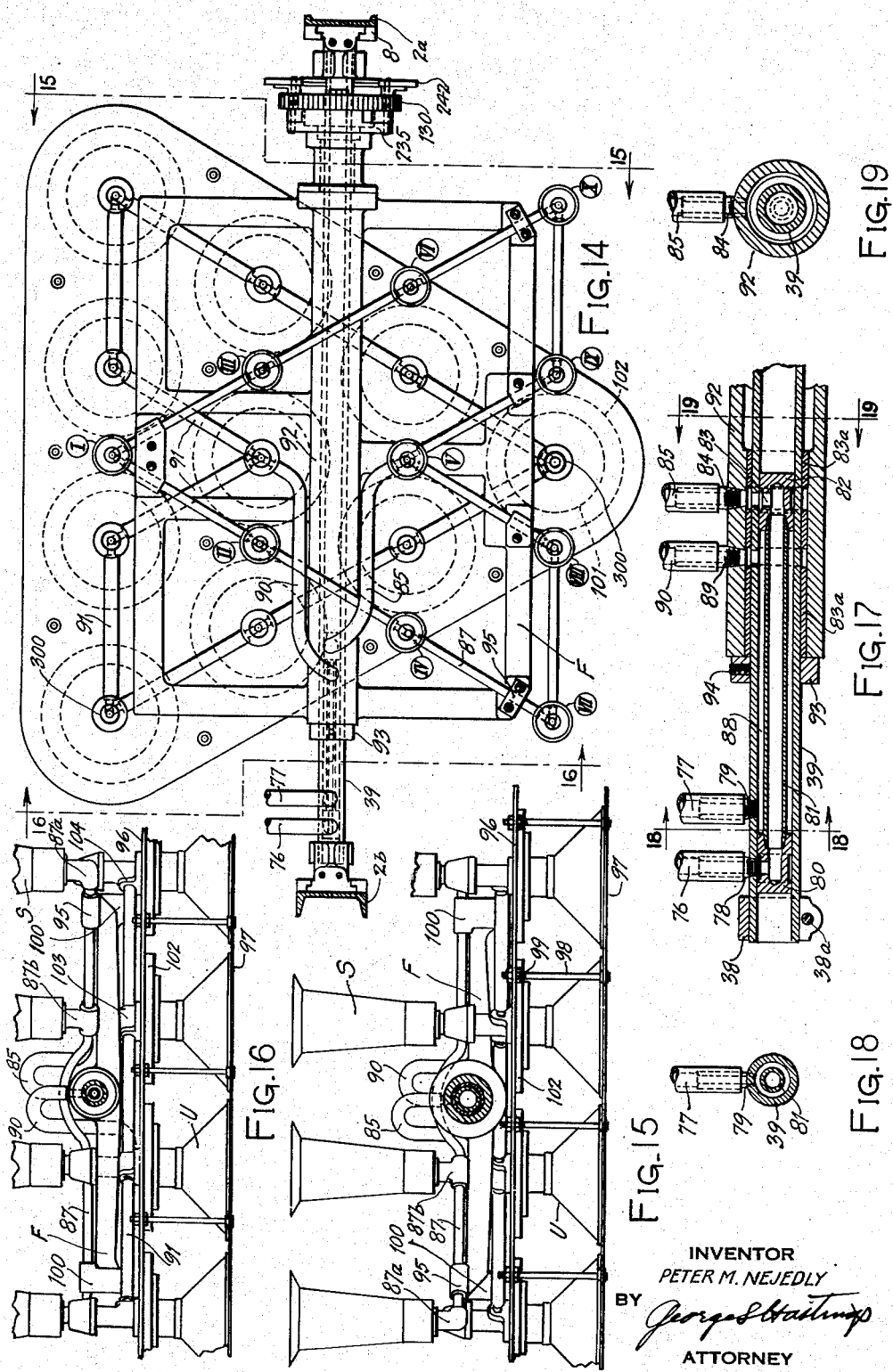
INVENTOR
PETER M. NEJEDLY
BY
George S. Hastings
ATTORNEY Oct. 13, 1942. P. M. NEJEDLY 2,298,718
BOWLING PIN SETTING MACHINE CONTROL MECHANISM
Filed June 7, 1940 11 Sheets-Sheet 7
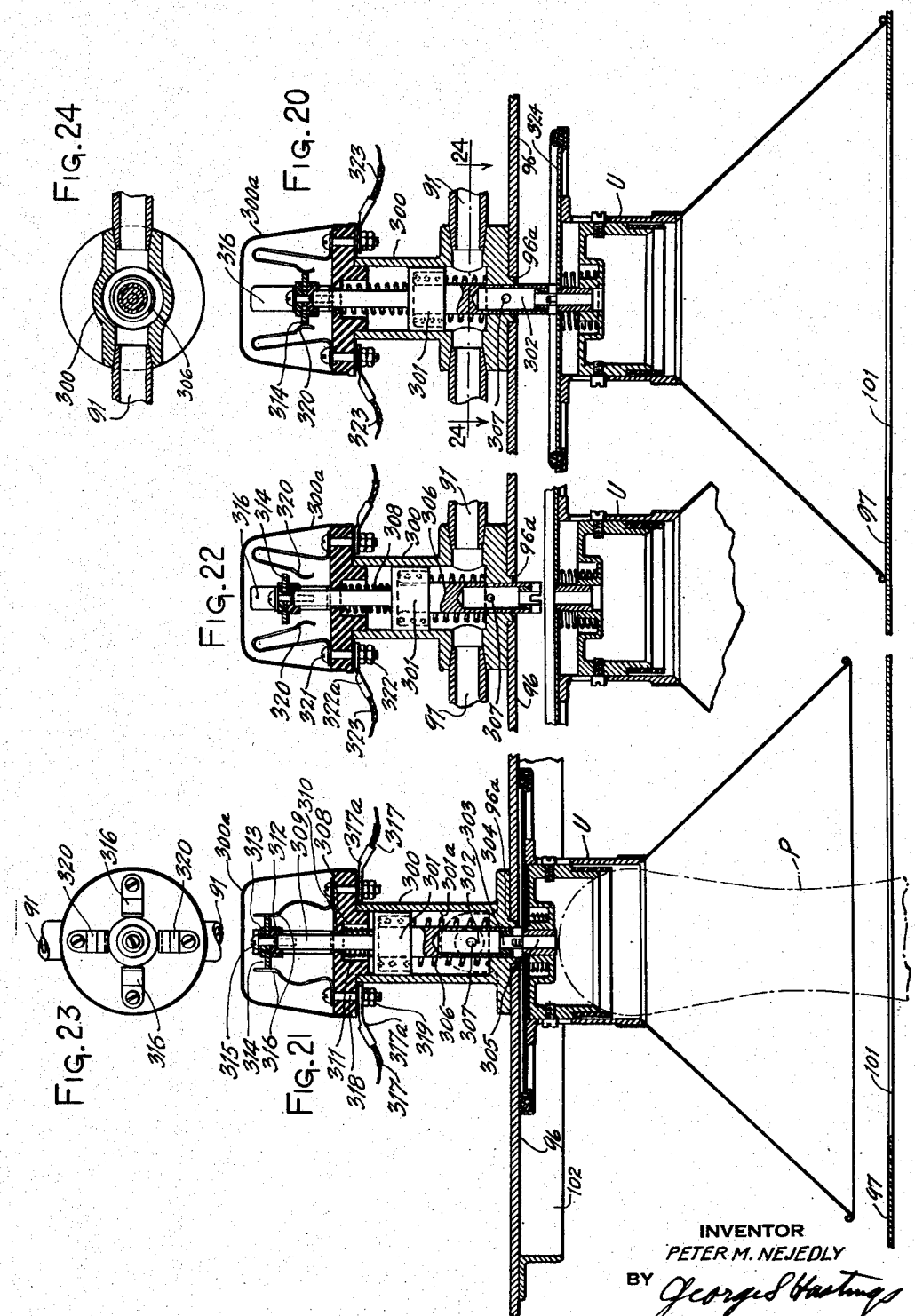
INVENTOR
PETER M. NEJEDLY
BY George S Hastings
ATTORNEY Oct. 13, 1942.                    P. M. NEJEDLY                    2,298,718
                  BOWLING PIN SETTING MACHINE CONTROL MECHANISM
                      Filed June 7, 1940          11 Sheets-Sheet 8
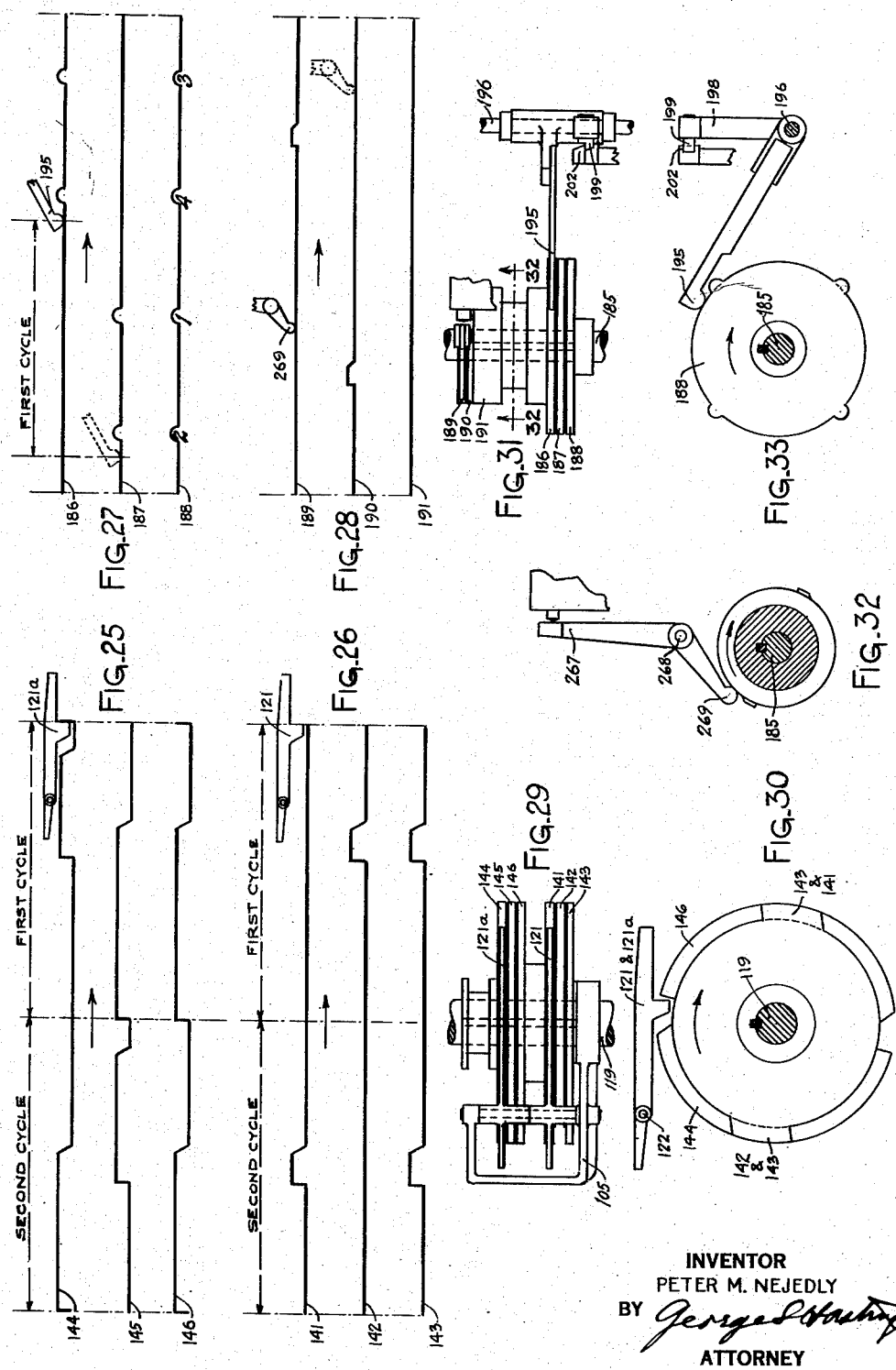
INVENTOR
PETER M. NEJEDLY
BY George S. Hastings
ATTORNEY

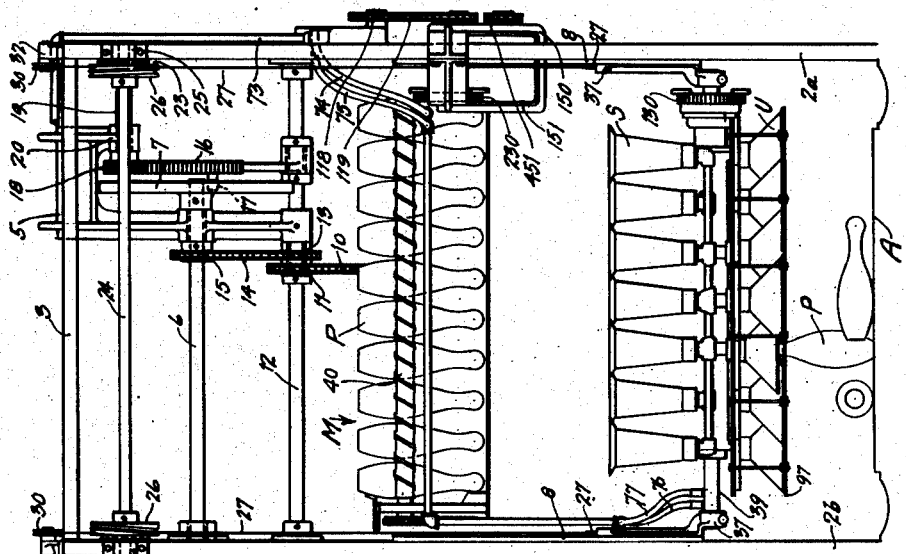

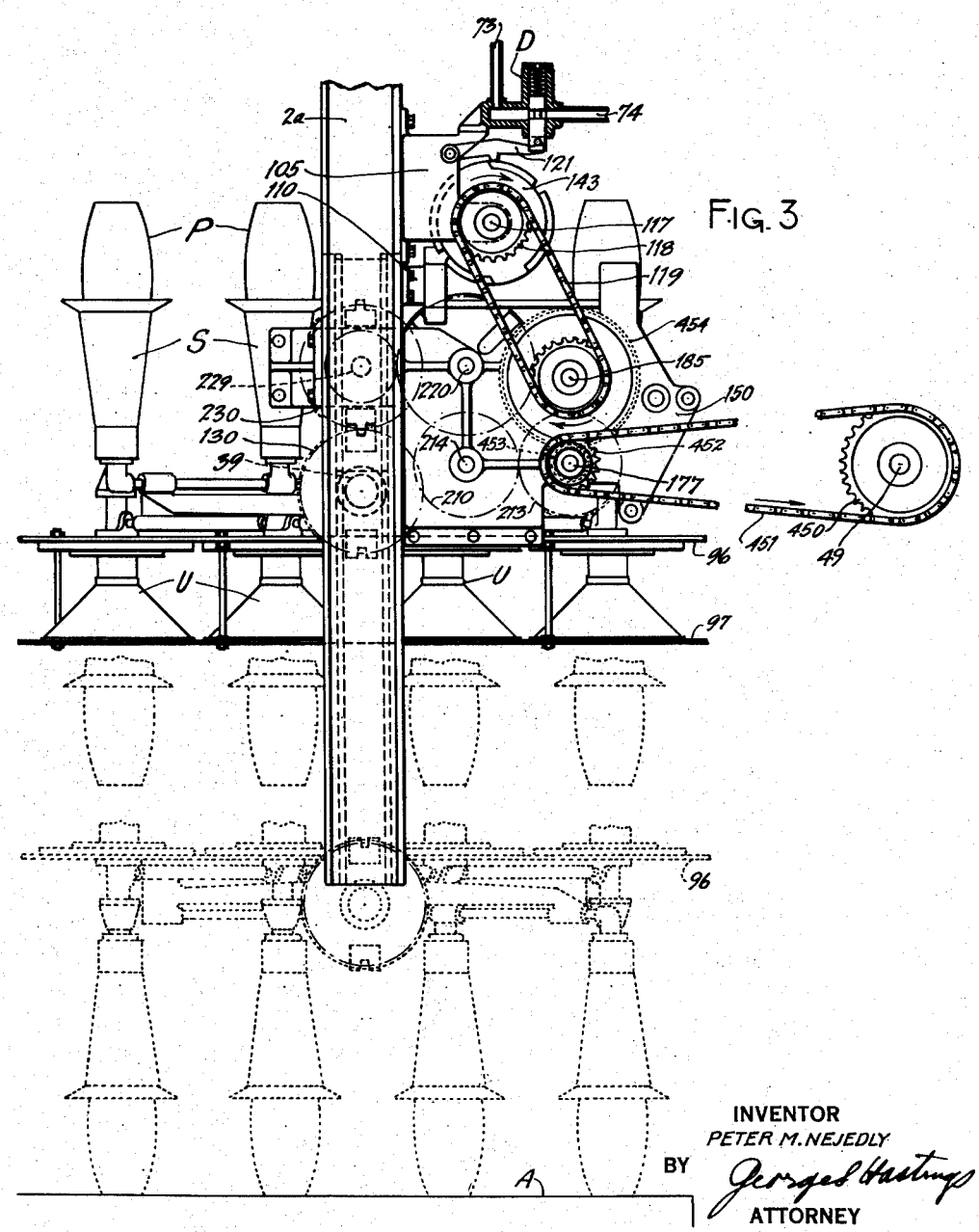

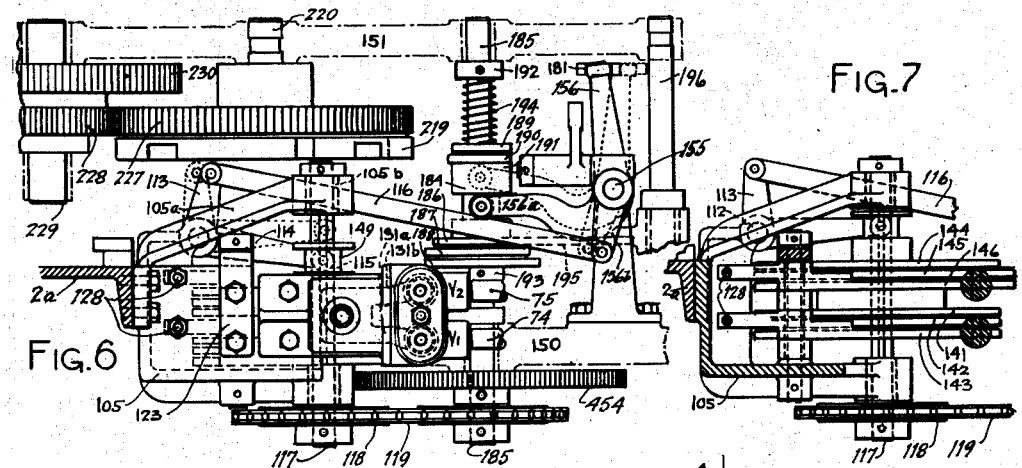

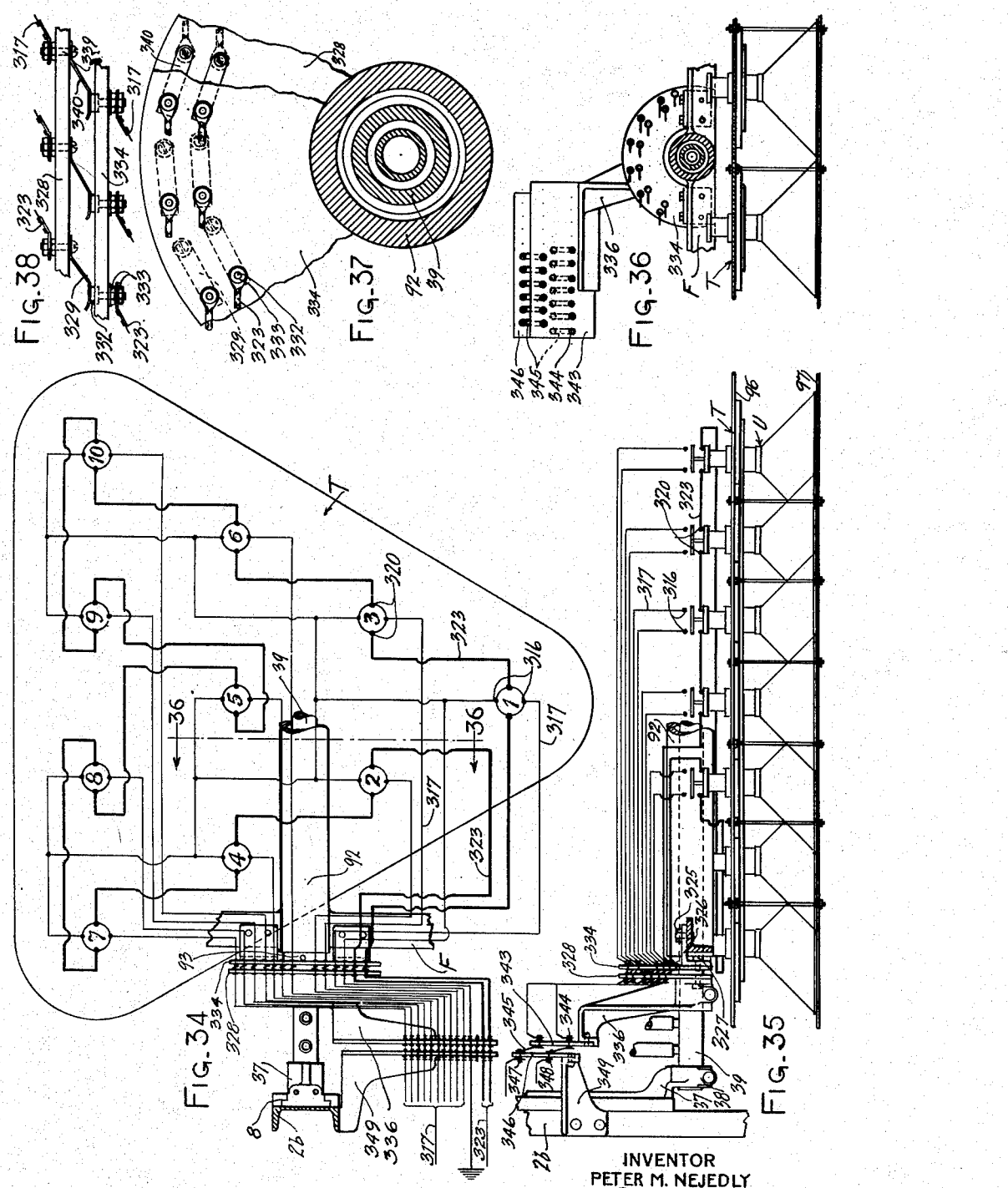

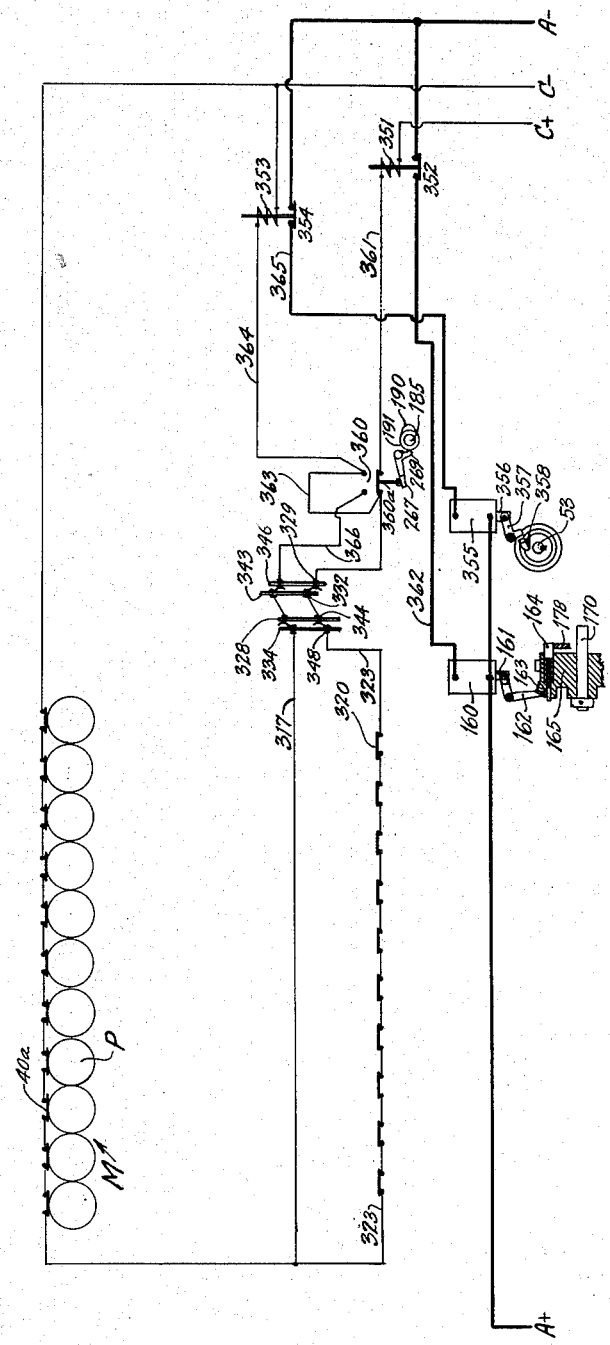

Oct. 13, 1942.  P. M. NEJEDLY  2,298,718
BOWLING PIN SETTING MACHINE CONTROL MECHANISM
Filed June 7, 1940  11 Sheets-Sheet 11

INVENTOR
PETER M. NEJEDLY
BY *George S. Hastings*
ATTORNEY

Patented Oct. 13, 1942

2,298,718

UNITED STATES PATENT OFFICE 2,298,718

BOWLING PIN SETTING MACHINE CONTROL MECHANISM

Peter M. Nejedly, Brooklyn, N. Y., assignor to American Machine and Foundry Company, a corporation of New Jersey Application June 7, 1940, Serial No. 339,344

49 Claims. (Cl. 273—43)

This invention relates to bowling pin setting machines and more particularly to improvements in completely automatic bowling pin setting machines wherein means are provided for setting pins in proper arrangement on the bed of a bowling alley, removing "deadwood" after the throwing of a ball, and respotting pins which remain standing after the removal of "deadwood" so that the play of the game can be continued in rapid order.

This invention also relates to automatic bowling pin setting machines and more particularly to improvements in control devices suitable for operating such machines in order to automatically effect various changes in its operation depending upon the several possibilities with respect to the number of pins knocked down by one or more balls. That is, if a strike is made the machine automatically registers the effect and more pins are fed from a magazine to the bed of the alley. So also, if a spare is made, other control mechanisms are automatically put into operation which will register the effect and cause the machine to go through a different set of operations than when a strike is made. Also if less than ten pins are knocked down by one or more balls, the machine will follow through certain cyclic operations which are different from those arising when a strike or spare is made.

It is, therefore, an object of my invention to provide improved mechanism for automatically changing the sequence of operation of my machine whenever a strike or spare is made or less than ten pins are knocked down by the number of balls allotted to a player for each frame of the game.

It is a further object of my invention to provide automatic mechanism which will throw one set of control devices into operation when a strike is made and another into operation when a spare is made and differentiate between the two.

It is a further object of my invention to provide an automatic bowling pin setting machine in which a plurality of pins, usually ten, is transferred from a magazine into a pin setting device and placed upon the bed of an alley in proper playing arrangement, and wherein after the throwing of a ball, mechanism is set into operation by the pin setting means for determining the effect of a thrown ball with respect to standing pins.

It is a further object of my invention to provide an automatic pin setting machine wherein a vertically moving pin setting device is provided with means which assist in determining the number of pins felled by each ball thrown and wherein control mechanism is advanced for changing the sequence of operations of the machine depending upon the number of pins knocked down by the first or second ball.

My invention also contemplates the provision of improved control mechanism associated with suction bowling pin handling means in which the suction handling means cooperate to furnish a new set of pins to the bed of a bowling alley whenever the control mechanism indicates that more pins are needed to continue the play of the game.

My invention also includes the provision of a vertically movable pin setting table provided with setting and resetting members in which the table also is adapted to rotate in a single direction under the control of mechanism which determines the number of pins knocked down by each ball thrown and causes a change in the sequence of operations of the setting table.

My invention also consists of the provision of a movable rotary pin setting device provided with setting and resetting members in which the device is intermittently turned in a single direction in order to be positioned properly for receiving pins, and discharging them in playing arrangement on a bowling alley.

The invention also consists in the provision of a rotary pin setter and resetter table which is movable to and from a bowling alley and is indexed intermittently in but a single direction at proper intervals when said table is located above the alley in pin receiving position.

It is a further object of my invention to provide a pin setting device provided with pin handling members, each of which has associated therewith means for determining whether or not pins are standing after the throwing of the first ball of a frame so that when the device is moved towards an alley after a first ball is thrown and all pins are knocked down, selective means will be operated to initiate the feed of another set of pins to the alley.

My invention also includes improved strike control mechanism made operative whenever a strike is made by a bowler in which a control element is activated to select certain cams of a series to carry out a predetermined operative sequence.

My invention also consists in the provision of mechanisms which will distinguish between strikes and spares, and cause a relative movement between a set of control cams and an index control member so that the pin setter table, which places pins on the alley, will be properly operated at the proper time to place a new set of pins on the alley.

It is an added object of my invention to provide strike and spare control mechanism of a type which will satisfactorily differentiate between strikes and spares and cause selective mechanism in the form of shiftable cams to be moved into predetermined positions for coaction with control elements which cause my machine to carry out a series of predetermined functions necessary to its proper operations.

With these and other objects not specifically mentioned in view, the invention consists in certain combinations and constructions which will be hereinafter fully described, and then set forth in the claims hereunto appended.

In the accompanying drawings which form a part of this specification, and wherein the several reference characters designate the same or like elements:

Figure 1 is a sectional side elevation partly diagrammatic, showing a preferred embodiment of various mechanisms for automatically operating and controlling a bowling pin setting machine;

Figure 2 is a front elevation showing a part of the mechanism of Figure 1;

Figure 3 is a partial side elevational view of the control mechanism and the pin handling table;

Figure 4 is a side elevation partly in section, taken on line 4—4 of Figure 5 showing a preferred form of control mechanism, the frame being omitted for sake of clearance;

Figure 5 is an end elevation of Figure 4;

Figure 6 is a plan view of Figure 4;

Figure 7 is a sectional plan view on line 7—7 of Figure 4 showing the suction valve control mechanism;

Figure 8 is a side sectional elevation of the mechanism of Figure 9 showing in section taken along line 8—8 construction of the index locking mechanism and its connection to the pin setter table;

Figure 8a is a sectional view of a detail taken on line 8a—8a of Figure 8;

Figure 9 is a plan view of Figure 8;

Figure 10 is a rear view of the control mechanism shown in Figure 8;

Figure 11 is a front view of the indexing mechanism, partly in section showing the connections between the pin setter table and the indexing device;

Figure 12 is an enlarged view, partly in section, of parts shown in Figure 10;

Figure 13 is a side elevation of Figure 12;

Figure 14 is a plan view of the pin setter table showing suction connections to the spotter and re-spotter funnels;

Figure 15 is a sectional elevation on line 15—15 of Figure 14;

Figure 16 is a sectional elevation on line 16—16 of Figure 14;

Figure 17 is a sectional view showing the suction inlet to the pin setter table;

Figure 18 is a sectional view on line 18—18 of Figure 17;

Figure 19 is a sectional view on line 19—19 of Figure 17;

Figure 20 is a sectional view showing a re-spotter unit resting on the bottom shelf of the table, the suction turned on bringing the valve stem down to hold the re-spotter secure while the table is rotated 180°;

Figure 21 is a sectional view showing the same respotter when raised by the pin and sealed against the top plate of the table and the valve piston forced up so as to lead suction into the valve to hold the pin and funnel secure to the table;

Figure 22 is a partial sectional view showing the suction valve in a neutral position;

Figure 23 is a top view of the switches shown in Figure 21 with the cover removed;

Figure 24 is a sectional view on line 24—24 of Figure 20;

Figure 25 is a development of suction cams for the respotter units;

Figure 26 is a development of the suction control cams for the pin handling units on the table;

Figure 27 is a development of cams for indexing the pin setter table;

Figure 28 is a development of cams for strike control circuit breaker and spare control mechanism;

Figure 29 is a plan view of the spotter and respotter cams;

Figure 30 is a side elevation of Figure 29;

Figure 31 is a plan view of the cams for indexing the pin setter table;

Figure 32 is a sectional elevation on line 32—32 of Figure 31;

Figure 33 is a side elevation of Figure 31;

Figure 34 is a diagram showing circuits from the respotter switches on the pin setter table;

Figure 35 is a front elevation of Figure 34 with part of the wires omitted for clarity;

Figure 36 is a sectional elevation on line 36—36 of Figure 34;

Figure 37 is a fragment of Figure 36 drawn to a larger scale;

Figure 38 is a plan view of Figure 37;

Figure 39 is a wiring diagram showing the wiring from the pin setter table to the control mechanism;

Figure 42:
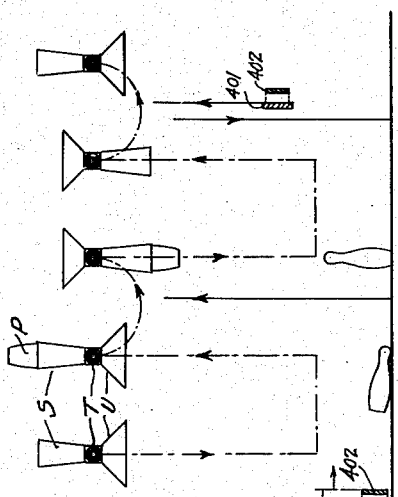
Figure 42 is a diagram showing the progressive operations after the second ball has knocked down all the pins left standing by the first ball, resulting in a spare.

Referring to the drawings, in Figures 1, 2 and 3, I have shown a preferred form of my invention wherein are provided side frame uprights 1a, 1b, 2a, and 2b connected by cross frame members 3 and 4 and longitudinal members 28. Supported on cross frame 4 is a bracket 5 in which one end of a shaft 6 is journalled; the other end is mounted in a bearing in side frame 1b (Figures 1 and 2) and carried by the shaft is a cam 7. Shaft 6 is rotated by means of shaft 49 through sprocket 9 fastened to shaft 49 by means of a sprocket chain 10 tracking sprocket 11 fastened to shaft 12. Through sprocket 13, also fixed to shaft 12, the drive is transferred by sprocket chain 14 to sprocket 15 mounted upon shaft 6 to rotate cam 7. Bowling pins, which are to be set upon the alley bed, are transferred from a magazine M by means of mechanism which may take the form of that shown in co-pending application, Serial No. 260,901 filed by Rupert E. Rundell on March 10, 1939. The pins are placed in predetermined arrangement in the table T, which is raised, lowered and inverted relative to the alley bed. In order to accomplish the desired movement of the table T, a gear segment 16, loosely mounted on shaft 12 and oscillated by means of a cam follower 17 mounted on the segment and engaging cam 7 causes the segment to rotate pinion 18 fixed to shaft 19 supported in arm 20 of bracket 5. Also fixed to shaft 19 is a sprocket 21 about which is trained sprocket chain 22 tracking a sprocket 23 fixed to shaft 24 mounted in brackets 25 supported by the side frames 2a and 2b of the machine.

Mounted on shaft 24 is a pulley 26 about which is trained cable 27 suitably connected at 28 to slide member 37, vertically slidable in guides 8 on side frame member 2a and provided at its lower end with a bracket 38 and a clamp nut 38a which secures hollow shaft 39 of table T in the slide bracket 38 for vertical movement. The further construction and operation of table T will be described hereinafter. Also assisting in the vertical movement of the table T is a cable 29 which is trained over pulley 30 supported by shaft 31 journalled in bracket 32 mounted on cross frame 3. Cable 29 extends over a similar pulley 35 mounted on shaft 33 supported by bracket 34 mounted on frame member 4. A counterweight 36 acts to balance the table. While I have only described the mountings of single cables, it will be apparent from Figure 2 that these cables may be provided on both sides of the machine.

Pin Handling Mechanism

As shown in Figures 1, 2, 3 and 14 to 16, inclusive, the table T comprises a plurality of pin setter elements S mounted on one side and a plurality of respotting units U mounted on the other side. The arrangement of the setters S and respotting units U conforms to the usual playing positions of pins on the alley bed, but may be varied in any other manner if desired.

Pins P, which are to be transferred and set upon the bed of a bowling alley, are fed from the pit of the alley by suitable mechanism (not shown), which may include spiral members 40 forming a part of a magazine indicated generally M wherein a plurality of pins, usually ten or more, is arranged in alignment for the removal therefrom of the desired number at a predetermined time by means of grippers 41 which are mounted upon a vertically and horizontally movable conveyor device designated 42 which consists of a plurality of longitudinal bars 43 secured to transverse supports 44. On bars 43 are slidably mounted carriages 45 which in the preferred embodiment are provided with independent gripping fingers 41 which engage and grip the required number of up-ended pins in magazine M for transfer to pin setter S (Figure 1).

The raising and lowering of the table T and operation of the pin transfer mechanism 42 is accomplished by means of a motor 47 mounted upon frames 1a, 1b of the machine at 48. A stud shaft 49 is driven by means of the sprocket 50 from the motor shaft 51 through a sprocket 52 mounted thereon and a chain 52a. The drive is transferred from shaft 49 to shaft 6 by means of sprocket chain 10 in the manner described hereinafter. In like manner, shaft 53 on which is mounted cam 54 which causes the raising and lowering of pin transfer 42, is driven by means of sprocket 55 mounted on shaft 49 through sprocket chain 56 tracking a sprocket 57 on shaft 53. Cam 54 is provided with a high and a low portion, and whenever the low portion is engaged by cam follower 58 on lever 59, the transfer 42 will be either in pin receiving position over the magazine M or in pin delivering position over setters S. Lever 59 is provided with an arm 60 to which is attached a link 61 connected at 62 to lever 63 provided with an arm 64 pivotally connected to bar 44 forming a cross member of the frame of transfer 42.

The carriages 45 are moved longitudinally along bars 43 by means of pinions (not shown) mounted on shaft 69 journalled in arm 68 which also form a part of lever 59 mounted on shaft 69. On shaft 69 is provided a sprocket 70 over which tracks a sprocket chain 71 engaging the sprocket 72 on shaft 67 by means of a pinion (not shown) on shaft 69 engaging a suitable driving means, such as a gear segment (not shown) of the type described and disclosed in the above referred to co-pending application. In this manner the bowling pins are lifted from spirals 40 by grippers 41, moved clear thereof, transferred longitudinally and located in proper arrangement in pin setters S where they are held while the carriages 45 with their grippers 41 move back to obtain a new set of pins.

Suction Grippers

After the carriages 45 have delivered the pins from the magazine to the setters S, the pins, gripped firmly therein by suitable means such as mechanical grippers or holders operated by suction, provided in the table from a suitable source of supply through a conduit 73 and valves $V_1$ and $V_2$, hereinafter described more in detail, are transferred to the alley A. Conduit 74 connects valve $V_1$ (Figures 4, 5 and 6) through a flexible conduit 76 to a hollow plug 78 fixed in hollow shaft 39 (Figure 17), so that suction created in conduits 74, 76 can be transmitted through a two-way element 80, which supports one end of a hollow shaft 81, through two-way elements 82 fastened to the other end of member 81 and provided with an opening connecting a hollow plug 84 with a flexible conduit 85. Conduit 85 conducts suction to ducts 87 which are connected to each of the pin setter units S. Since plug 84 is adapted to rotate relative to fixed hollow shaft 39, a circumferential suction passage 83 is formed in element 82, shaft 39 and sleeves 83a which surround shaft 39. In this manner it is possible to create the desired fluid pressure, and maintain it regardless of the rotation of table T.

In order to operate the resetting or respotting members U, I have provided a flexible conduit 77 which connects with conduit 75. Flexible conduit 77 connects to a hollow plug member 79 fast in shaft 39, and suction is inducted into the hollow shaft therefrom through a circumferential passage 88 similar to 83 into the bore of plug 89 about which is seated flexible conduit 90 which through ducts 91 supplies the several respotting units U with fluid pressure whenever pins are to be lifted and respotted.

Pin Handling Elevator

Table or elevator T consists generally of a frame F provided with a central barrel or hub 92 mounted upon sleeves 83a for rotation about and relative to stationary shaft 39. Barrel 92 is held in proper position upon shaft 39 against lateral movement thereon by means of a collar 93 positioned about shaft 39 and locked in adjusted relationship thereto by means of a set screw 94. Referring to Figures 14, 15, 16 and 17, it will be seen that frame F supports the several setters S in usual substantially triangular pin formation, although any other desired arrangement may be used. Setters S are rigidly mounted upon pipes 87 which are clamped to the frame F by means of clamps 95 fastened to frame F.

Pin setters S corresponding to bowling pins, numbers 1, (I), 5, (V), 7, (VII) and 10, (X), in the form shown, are provided with elbows 87a connecting them to the system of pipes 87, while the remaining setters are mounted upon the pipes 87 by means of T units 87b. Attention is called to Figures 15 and 16 which illustrate this method of mounting the setters S. Inasmuch as suction is inducted into the system 87, by means of conduit 85, it will be uniformly distributed through the several pin setters as desired. The table T also comprises an upper plate 96 and a lower plate 97 provided with a number of openings 101 therein corresponding to the number of pin respotting units. These two plates are connected by means of spacers 98 which by means of suitable nuts 99 hold them rigidly separated one from another. Upper plate 96 is secured to frame F by means of brace 100 extending downwardly from the frame F. Slidably mounted upon lower plate 97 and substantially concentric with each of the openings 101 therein, are the bowling pin respotting units U, which are substantially the same as those shown and described in the above referred to application. In order to prevent excessive lateral movement of the respotters U on their support, circular depending flanges 102 are mounted on the under surface of plate 96. In order to control the operation of the bowling pin setters, insofar as the application of suction is concerned, when it is desired to lift pins from the alley for respotting, brackets 103 are employed, which support suction conduits 104 to which suction is conducted by means of pipe 91 described previously.

SUCTION VALVE CONSTRUCTION

In order to control the suction in the pin setters S and respotting units U, there has been provided a housing 105 which has lugs 106 through which project screws 107 fastening the housing to machine frame 2a (see Figures 3 to 7, inclusive). Also secured to frame 2a by means of screws 109 is a bracket 110 having a bearing 111 in which is journalled a shaft 112. Secured to one end of shaft 112 is a crank arm 113 while at the other end is fixed a lever 114 provided with a cam follower 115. Crank 113 is connected to a link 116.

Also forming a part of housing 105 is an arm 105a provided with a journal 105b (Figure 6). A shaft 117 is journalled in journal 108a of projection 108 formed on housing 105 and in the journal 105b. Mounted on shaft 117 is a sprocket 118 which through sprocket chain 119 drives the shaft in the direction indicated in Figure 4. Levers 121 and 121a are journalled on shaft 122 mounted in housing 105 and bracket 123 secured to housing 105 by screws 124. Shaft 122 is fixed in housing 105 by a set screw 126. Levers 121 and 121a are provided with portions 127 arranged to engage with adjustably mounted set screws 128 mounted in housing 105 and thereby control the downward movement of the levers.

The suction control mechanism may consist of a double valve device, designated generally D (Figures 1, 4, 5 and 6) having a bracket portion 129 mounted upon housing 105 by means of screws 130. Two valves $V_1$ and $V_2$ are provided, for reasons described hereinafter, and since the construction is identical it will suffice to describe one in detail. Valves $V_1$ and $V_2$ are arranged side by side and in the illustrated embodiment are formed in a single unit. Slidably mounted in each of the valves is a piston member 131, having a slotted lower end and a pin 132 resting on the end of lever 121. Piston member 131 is provided with a reduced portion 133 approximately midway of its length, and at its free end has a substantially L-shaped bore 134. The piston is slidably movable in bore 135 formed in each valve device. A spring 136 bears against and tends to urge each piston 131 into suction cut off position in which the reduced portion 133 lies out of alignment with bore 139 so that L-shaped bore 134 bleeds through opening 138, and pipe 74, and the tail 127 of lever 121 rests against set screw 128 thus preventing excess downward movement of lever 121. In this position (see Figure 4) all suction through conduit 74 is cut off.

Cam follower 120 on lever 121 is provided for tracking one or more cams which are moved into cooperating position therewith as described hereinafter. In this manner lever 121 is raised against the compression of spring 136, reduced piston portion 133 is aligned with bore 139 and pipe 74, suction flows from conduit 73 to pipe 74 and thereby enters either the pin setter or the pin respotting system, and either one or the other, respectively, is made active for gripping and handling pins, as pointed out above. As stated, valves $V_1$ and $V_2$ are identical in construction and operation although they are operated in different timed relation, as will be made evident hereinafter. A single source of suction 73 feeds both valves. A bore 131a connects valve $V_1$ and a similar bore 131b connects valve $V_2$ with the source of suction.

SUCTION VALVE CONTROL MECHANISM

The operation of valves $V_1$ and $V_2$ is controlled by a series of cams slidably mounted on and rotating with shaft 117. As shown in Figures 4, 5, 6 and 7, cams 141, 142 and 143 coact with cam follower projection 120 on valve lever 121, and cams 144, 145 and 146 cooperate with projection 120a on valve lever 121a to open and close these valves. The cams may all be formed as an integral unit or connected together (as shown, secured to a disk 174, and mounted for sliding movement as a unit on shaft 117). Fixed to cam 144 is a hub 148 having a reduced portion 149 engaged by cam follower 115 carried by lever 114 so that whenever this lever is rocked, the cams will be shifted along shaft 117.

Mounted on frame 2 are other elements of the control mechanism in which the several stationary shafts thereof are fixed in spaced frame members 150 and 151 secured to the frame 2 and to each other at 153 (Figure 9).

PIN TABLE INDEXING MECHANISM

The mechanism for indexing the pin setter table will now be described. Referring to Figure 12, it will be seen that a solenoid 160 mounted on frame 151 (Figure 10) is provided with an armature 161 connected to a bell crank lever 162 pivotally mounted at 162a in a bracket 162b in which is also mounted shaft 155 to which lever 156 is attached. Lever 156 is provided with an arm 156a, and to the upper end of shaft 155 is attached an arm 156b. Arm 156b is pivotally connected to link 116 (Figure 6). The free end of lever 162 is provided with a trigger or hammer portion 162c movable by operation of solenoid 160 into engagement with latches 163 mounted about a turret 165. These latches cooperate in holding the pins 164 in inoperative position. From a reference to Figures 12 and 13, it will be seen that solenoid 160 has been energized whereupon armature 161 has moved lever 162 from its normally inoperative position, as shown in dotted lines in Figure 12, to its latch engaging, or full line position, where impact arm or hammer 162c has engaged a latch 163; hence under such conditions the latch is tripped, and the pin 164 under its control is released. Turret 165 carries a plurality of pins 164 spaced ninety degrees apart, as shown in Figure 13. Each of the pins is slidably mounted and normally spring urged into operative position. Each pin is also provided with a reduced portion 164a adapted to be engaged by tail 163a of latch 163 for locking the pin in inoperative position. As shown in detail in Figure 12, each pin 164 is slidably mounted in bores 165b formed in the turret 165, and encircling each pin is a spring 165a, one end of which engages a shoulder 164b of pin head 164a while the other end of the spring bears against a shoulder 165c of the bore 165b.

The several latches are pivotally mounted at 166 in grooves or slots 167 formed in the turret. Springs 168 located in bores 169 formed in the turret 165 urge latches 163 into latching position as the pin 164 is pushed in when the pin head 164a rides on cam 164c.

Turret 165, which is responsible for the operation of the strike control mechanism of the machine, is loosely mounted on shaft 170, and has either formed integrally therewith or suitably attached thereto a gear 171 which is driven by gear 172 mounted on shaft 173, meshes with gear 174 on shaft 175, and gear 174a, also on shaft 175, which are driven by gear 176 on shaft 177. Shaft 177 is driven from sprocket 450 on the main drive shaft 49 through chain 451 to sprocket 452 on shaft 177. Pinion 453 on shaft 177 meshes with gears 454 on shaft 185 on which are mounted the several cams (186 to 191, inclusive) which control the various operations as will be hereinafter described.

Referring to Figure 13, which shows the angular arrangement of the four pins 164 used in the illustrated form of my invention, it will be seen that in its counter-clockwise movement, each pin, if and when it is released from latch 163, becomes operative approximately forty-five degrees from the vertical, at which time it engages cam surface 182 of a lever 178, hereinafter described more in detail. It is also to be noted that as the turret is rotated step by step through 90° each cycle of the machine during which time shafts 6 and 53 make one and two revolutions, respectively, each of the pins 164 will be moved past hammer or trigger head 162c and if the pin is not released by the striking impact of the hammer with its locking latch 163 because the hammer 162c is not operated to unlatch it, the pin cannot project from the turret, as shown in Figure 12, and hence cannot engage cam portion 182, as above mentioned, and operate the strike control mechanism.

Whenever turret 165 conveys any of the pins 164 past trigger 162c, and a particular pin is released from a particular latch, that pin will operate in the manner above described. That is, when a pin 164 is unlatched, spring 165a, which abuts against shoulder 164b, forces the pin to the right (Figure 12) and the strike control mechanism will be rendered operative.

Lever 178 is pivotally mounted on shaft 179 fixed in frame 151. A collar 180 pinned to shaft 179 limits the lever against lateral movement. Lever 178 in addition to the cam 182, substantially midway of its length, is also provided with a yoke 181 at its free end in which rides a roller 157 carried on the end of lever 156. In this manner whenever lever 178 is rocked about its pivot because of its engagement with a pin 164, link 116 rocks lever 113, which shifts collar 148 and its associated cams along shaft 117. Arm 156a of lever 156 is provided with a cam follower 158 which rides in a groove 183 formed in member 184 slidably mounted on shaft 185. Attached to or formed integrally with member 184 are cams 186, 187 and 188 on one side of groove 183, while cams 189, 190 and 191, the last of which is a blank, are located on the other side. Spring 194, which encircles shaft 185, bears against collar 192 fixed to shaft 185 and urges member 184 against collar 193 also pinned to shaft 185.

When the lever 178 is moved by a selected pin 164, it causes yoke 181 to rock arm 156 which controls the movement of the strike and spare cams. Hence, if there is a full stroke of lever 156 (from full-line to dotted-line position, Figures 6 and 13), the movement of member 184 along the shaft 185 will position cam 188 in the path of a lever 195 mounted on shaft 196 for engagement by the bumps 197 of cam 188 for indexing the pin setter table T through one-half of a revolution.

When a bump 197 engages with lever 195 it swings a lever 198, fast on shaft 196, provided with a locking nose 199 out of locking engagement with lever 202. A spring 203, one end of which is secured at 204 to the lever 198 and the other end of which is suitably connected to the frame, normally urges lever 198 into locking engagement with lever 202.

Lever 202 is mounted on one end of a shaft 206, which is journalled in brackets 206a and 206b suitably secured to frame 150 of the indexing mechanism. At the other end of shaft 206 is mounted a lever 207, provided with cam followers 208 and 208a. Cam follower 208 runs in a groove 209a in member 209 formed integrally with or suitably attached to gear 210 which is slidably and rotatably mounted on a fixed shaft 214. A spring 211 located in a recess 212 in frame 150 bears against lever 207 so that whenever lever 202 is released from locking engagement with lever 198, the spring 211 forces gear 210, which meshes with gear 213 fixed to shaft 177, to slide along shaft 214, each of which shafts makes two revolutions per cycle of the machine.

Fastened to or formed integrally with gear 210 is an arm 216 provided with a cam follower 217 arranged to engage slots 218 in a Geneva gear 219 rotatably mounted on shaft 220 whenever lever 207 is rocked by shaft 206 to slide arm 216 into engagement with Geneva gear 219 whereupon cam follower 217 carried by arm 216 is positioned to engage one of the slots 218 in Geneva gear 219. As shown, slots 218 are spaced 90° apart so that every time the cam follower 217 engages in a slot 218, the Geneva gear will be indexed through 90°. Spaced 90° apart about the periphery of Geneva gear 219 and between slots 218 are apertures 221 into which fits a projection 222 mounted on a lever 223 pivoted at 224 and provided with a cam follower 225 tracking a cam 226 mounted on the hub of arm 216. In this manner, after each indexing movement of arm 216, projection 222 will be brought into engagement with an aperture 221 to lock the Geneva gear 219 against overrun.

Attached to or formed integrally with Geneva gear 219 is a gear 227, which meshes with and drives gear 228 mounted on shaft 229 journalled in side frames 150 and 151. The gear ratio between gears 227 and 228 is one to two (1:2), so that for every 90° of movement of gear 227, gear 228 is rotated through 180° thereby turning table T through 180°. At the conclusion of the indexing operation, a cam 215 mounted on the face of gear 213 engages cam follower 208a on lever 207 thereby disconnecting cam follower 217 from Geneva slot 218, whereupon cam follower 225 riding on cam 226 locks shaft 220 against further rotation because of the engagement of projection 222 with aperture 221 (see Figures 4 and 8). Also mounted on shaft 229 and either formed integrally with or attached to gear 228 is a gear 230. Fixed at 180° intervals adjacent the periphery of gear 230 and on the face thereof are plates 231 provided with projections 232. These projections are positioned to engage with cut-out portions or apertures 233 formed in plates 234 fixed to the face of a gear 130 mounted on hub 235 of table T.

From the above it follows that setter table T, which is mounted on shaft 39 supported by slide brackets 37 running in slides 8, will be in position to be turned on shaft 39 through 180° whenever one of the projections 232 carried by a gear 230 is in engagement with an aperture 233 carried by gear 130 (Figure 4).

Setter table T is provided at one end (see Figures 2, 9 and 14) with a hub 235 so that whenever gear 130 is rotated through 180°, setter table T also will rotate a similar amount. In order to lock the table against possible rotation until such motion is desired, there has been provided a latch and thrust collar 237 between hub 235 and one face of gear 130; this collar is keyed to shaft 39 and is provided with openings 238 in which fit noses 239 formed on latches 240 which are pivotally mounted on short shafts 241 carried by gear 130 and hub 235. In the present embodiment two latches spaced 180° apart are employed, thereby making it certain that the table will be unlocked for indexing at the proper time. Each latch is furnished with a control arm 242 and springs 243 cooperate with tails 244 formed on the latches to maintain noses 239 in locking engagement with openings 238. An adjustable link 245 connects levers 246 attached to shafts 241 so that whenever one latch 240 is moved out of engagement with collar 237, the other also will be moved. Mounted on the hub of arm 216, adjacent cam 226, is a cam 247 positioned to engage the control arms 242 of latches 240 so that whenever lever 216 moves to drive Geneva gear 219, the high portion of cam 247 engages one of the arms 242 of latches 240 and thereby unlocks gear 130 and hub 235 from collar 237 so that setter table T can be indexed the desired amount, in this case, 180°. It will be observed that gear 130 is so mounted that the setter table can be raised and lowered and also inverted in proper timed relation to the control mechanism. This arrangement also makes it possible to index the table in one direction.

Loosely mounted on shaft 256 is a star wheel 255 provided with a plurality of projections 255a positioned in the path of pins 164 on turret 165 so that during the rotation of the turret, whenever a pin 164 projects therefrom, the pin in addition to engaging cam surface 182 of lever 178 will also engage one of the projections 255a and turn star wheel 255 through one step, the magnitude of which depends upon the number of projections 255. In the present embodiment there are eight projections 255a and the star wheel is indexed 45°. A flat spring 257 bears against the periphery of star wheel 255 and prevents excess movement thereof under the influence of pins 164.

Fixed to wheel 255 is a cam 258 provided with alternate high and low portions, and so arranged that whenever star wheel 255 is indexed, cam 258 will also move through a given angle. Tracking on cam 258 is a cam follower 259 mounted on lever 260 pivoted on shaft 261. Lever 260 is also provided with arms 262 and 263, and to arm 263 is fastened one end of spring 264, the other end of which is suitably secured to a stationary part of the machine. Spring 264 maintains cam follower 259 in tracking engagement with cam 258. On the free end of arm 262 there is provided a projection 265 arranged to be moved into and out of the path of a pin 266 mounted on and projecting laterally from lever 178. The arrangement of this mechanism is such that whenever lever 178 is moving on its return stroke after having been moved outwardly by a pin 164, if cam follower 259 is running on a high part of cam 258, projection 265 will move clear of pin 266, but if cam follower 259 is positioned on a low part of cam 255 then projection 265 will be moved into the path of pin 266 and hence will lock lever 178 against full return movement.

As shown in Figures 6 and 13, movement of lever 178 is responsible for the movement and positioning of shiftable member 184, which has associated therewith a series of cams 186 to 191, inclusive. Movement of lever 178 also shifts disk 147 and the several cams 141 to 146, inclusive, which are associated therewith. Therefore, whenever a pin 164 moves lever 178 through a full stroke, cam 188 will be positioned to engage lever 195, which at the proper time sets into operation the indexing mechanism for the table T. So also, when lever 178 returns the full distance to its starting point, cam 186 will be located for engagement with lever 195 for a similar purpose. If, however, lever 178 is locked intermediate these positions because of the engagement of projections 265 with pin 266, then the table T will be indexed because of the operation of middle cam 187 which is then positioned for coaction with lever 195.

STRIKE AND SPARE CAMS

Figure 27 shows cams 186, 187 and 188 expanded. It will be noted that cam 188 is provided with four bumps, equidistantly spaced, or 90° apart, and that bumps 188$^1$ and 188$^2$ operate as one active set, while bumps 188$^3$ and 188$^4$ perform likewise as another set. Cam 188 is the strike control cam. Cams 186 and 187 are spare control cams. Each cam is rotated through one-half a revolution per cycle of the machine. The cams are so arranged that whenever a new set of pins has been set upon the alley, either cam 186 or 187 will be positioned with lever 195 coacting therewith after the throwing of the first ball. This is because in some instances lever 178 can move back to its original or inoperative position, in which case, cam 186 is positioned to engage lever 195, or in the event that cam follower 259 rests on a low portion of cam 258, lever 178 will be locked in its intermediate position and cam 187 will be located to engage with lever 195.

Assuming that the first ball has been thrown, the machine set into operation, and all the pins have been knocked down and that a strike results, pin 164 will be released to engage lever 178 for purposes described above, so that cam 188 will be shifted into position to coact with lever 195 for indexing the table and setting a new frame of pins on the alley. If two balls must be thrown and a spare results, either cam 186 or 187 will be engaged with lever 195. If, for instance, lever 195 is tracking cam 186 and a strike is made, cam 188 will be moved into engagement with lever 195 so that bump 1 on cam 188 will effect the indexing of the machine to deposit a new set of pins on the alley, and that in the continued movement of the cam, bump 2 of the cam 188 will cause the table to index through 180° in the same direction to return the pin setter into position to receive a new set of pins when the appropriate time arrives. Due to the fact that lever 178 has been moved by the pin 164, made operative by unlatching of latch 163, star wheel 255 has also been indexed, which means that cam follower 259 has moved off the high part of cam 258 onto a low part thereof thereby locking lever 178 in its intermediate position so that cam 187 is shifted for engagement with lever 195. When a ball of the next frame is thrown, if a strike results, the pin 164 which is selected will shift cam 188 again into engagement with lever 195 and a high part of cam 258 will be moved for engagement with cam follower 259 which means that projection 256 will be moved clear of pin 266 thereby allowing lever 178 to move its full throw, in which event cam 186 will be set for engagement with lever 195. If after the throwing of the first ball of any frame, pins remain standing, lever 162 cannot be moved into position to engage and unlatch pin 164 because solenoid 160 is not energized, and hence lever 178 will remain stationary so that either cam 186 or 187, if it be the one engaging lever 195, will remain coacting with lever 195 until another strike is made, whereupon cam 188 will be shifted in the manner described above into the place formerly occupied by either the cam 186 or 187.

SUCTION VALVE CAM CONTROL

Acting in conjunction with the pin control or strike or spare cams, just described above, are a plurality of means which are responsible for the proper operation of the suction valves, and the setting and resetting units respectively.

Figures 4, 5, 6, 9 and 25, inclusive, show a preferred form of mechanism for controlling the operation of the suction valves for the pin handling devices. Since cams 189, 190 and 191 are connected to member 184, it is evident that whenever cams 186, 187 and 188 are shifted back and forth along shaft 185, these cams also will be moved in a similar manner. Located to coact with and track these last-named cams 189, 190 and 191, is a lever 267 fastened to shaft 268 and provided with a cam follower portion 269 which travels upon the periphery of these cams. Lever 267 is, therefore, rocked by one of these cams, as selected, in proper timed sequence and is so constructed that it can simultaneously press against buttons 270, 271 which are mounted adjacent solenoid 160 (Figures 8, 13 and 32).

Switch 270 operates the pin carrier system 42 to effect the feed of additional pins to the pin setters S, and switch 271 operates signal mechanism which since it forms no part of my invention will not be described further herein. Lever 267 is provided with a projection 267a which engages both switches simultaneously. Because of this arrangement lever 267 can be operated by either cam 189 or 190 which forms a part of member 184 slidable on shaft 185. Each cam is provided with a single bump, tracked by lever 269, either formed integrally with lever 267 or as a separate lever fixed to shaft 268 so that as the selected cam is tracked by lever 269 the switches will be operated by lever 267 and the desired operating circuits energized in proper order.

It will be seen, therefore, that cams 189 and 190 are complementary in action to cams 186 and 187 and because the bumps of cams 189 and 190 are set to operate in advance of the high parts on cams 186 and 187, the pin carrier system will always feed pins to the pin setter S before the table P is indexed to deliver the pins carried by the setter upon the alley in proper playing arrangement.

During the interval in which the pin carrier system feeds pins to the setter and the indexing of the table from pin receiving to pin discharging position, the alley has been swept clear of "deadwood" and the fallen pins and ball have been shunted to their distributing means for return to the pin magazine and bowler, respectively, by means (not shown) which may be the same as that described in the co-pending application referred to hereinabove. In a like manner, cams 189, 190 are complementary, but due to the fact that cam 191 is a blank there will be no movement of lever 267, and hence whenever a strike is made and cam 189 is operative, switches 270 and 271 will not be disturbed, so that line 323 is a closed circuit due to the fact that switch 360a is closed, as shown in Figure 39, thereby providing for the operation of solenoid 160 and the feed of a set of pins to setters S, as described hereinbefore.

It follows, therefore, that in the operation of my machine different sequences of operation take place dependent upon the number of pins knocked down by each ball thrown. Therefore, if all the pins are knocked down by the first ball, or a strike is made, certain mechanisms will be selected and will operate, and likewise the machine will function differently if all the pins are knocked down with two balls when a spare results. So also a different sequence of operations will follow if all of the pins are not knocked down by the number of balls allowed for each frame of the game. The machine will automatically differentiate, select, set and reset the desired number of pins so that the play of the game may continue automatically and uninterruptedly insofar as the proper and desired setting of pins is concerned.

RESETTER UNITS ELECTRIC CONTROL

Figures 20 to 24, inclusive, show the detail construction of the resetter units U which have been mentioned hereinabove. The resetter units are each provided with means for conducting suction, automatically registering the presence or absence of standing pins, and, therefore, are responsible for the movement of pins to the setters S. Since all of the pin resetter units are the same, only one will be described in detail. In the preferred form a tubular bracket 300 is fixedly mounted upon plate 96 in centered relation with reference to an opening 96a therein, and in proper arrangement with respect to the required position of the pins as set and reset upon the alley, in usual triangular formation or other desired arrangement. A piston 301 is slidably mounted in the bore 301a of the bracket, and has associated therewith and fixed thereto a valve 302 provided with a bore 303 having a transverse suction distributing slot 304 in the free end thereof so that suction at all times may be distributed to the pin distributor unit. Suction is conducted from bore 303 through a bore 305 in each resetter unit which communicates with the space above the center of a pin. Coiled about the valve 302 is a spring 306 which bears against the piston and normally tends to urge it upward as shown in Figure 21. A suction opening 307 is formed in the bore in order to make it possible for suction to be fed from conduit 91, and hence through the bores 303 and 305 for gripping pins. In Figure 21 the suction opening 307 is shown aligned with conduit 91 so that suction is being conducted recausing the respotter to grip a pin. Projecting from the upper face of piston 301 is a rod 309 about which is coiled a spring 308 bearing against the upper face of the piston and tending to push it downwardly against the pressure of spring 306. Rod 309 extends upwardly through opening 310 in insulating plug 311 which is secured in the open end of bracket 300. Mounted on rod 309 are insulating plugs 312 and 313 between which is located a conductor disk 314 held thereon by means of a screw 315. Disk 314 is adapted to engage spring contacts 316 mounted 180° apart on insulating plug 311 by means of bolts 318 secured to contacts 317a of wires 317 by means of nuts 319. As shown in Figures 22 and 23, placed substantially 90° apart from contacts 316 are spring contacts 320 which are fixed to insulating plugs 311 by means of bolts 321 and nuts 322 which also secure contacts 322a of line 323. It will be noted that in Figure 21, disk 314 is shown as closing a circuit through spring contacts 316, while in Figure 22 the disk is shown in neutral or "circuit open" position. However, in Figure 20 the disk is shown closing a circuit through contacts 320 and wires 323. A light cover 300a is provided for protection against dust and injury to the switch unit.

In Figure 20 suction from the line 91 has pulled down piston 301 so that opening 307 is cut off from the source of suction and the pressure of valve 302 bearing against disk 324 is sufficient to hold the unit U against lower plate 97 so that it will not slide between support plates 96 and 97 during the indexing of the table T. From this it follows that although units U may be moved down into engagement with the heads of standing pins, as indicated in dot-dash lines in Figure 21, these pins will not be lifted. In Figure 21 a different operation takes place because suction opening 307 is aligned with conduit 91, the suction is conducted through bores 307 and 305 to grip a pin for lifting.

ELECTRIC SYSTEM FOR SETTER TABLE T

Referring to Figures 30 to 34, inclusive, it will be seen that mounted on frame F by means of bolts 325 are brackets 326 to which is fastened by means of bolts 327 a switch board 334. This board may be made of any suitable insulating material, such as Bakelite or the like, or any other suitable material commonly used for this purpose, and is formed in the general shape of a semicircle with the several switches 329 mounted thereon by means of bolts and nuts 330 and 331 to which are fastened wires 323 connected in parallel to switches 320 mounted on plugs 311 of the resetter units, as described hereinabove.

As shown in Figure 37, switches 329 are preferably formed of flat spring material and are mounted for engagement with contacts 332 secured by nuts 333 to fixed plate 328 which is rigidly mounted by means of screws 335 on an arm of bracket 336. The switches 329 may also be arranged in concentric semi-circles and the contacts 332 are likewise arranged in a complementary semi-circular relationship so that, whenever plate 328 is moved relative to plate 334, switches 320 will make or break circuits through the wires 323. Wires 323 are connected to contacts 332 by means of nuts 333 (as shown in Figure 38). As shown in Figures 32 and 33, there are two contacts for each set of wires 323 so that there are two switches 329 and two contacts for each set of wires leading to each respective pin resetter unit. As described previously, each resetter unit is also provided with spring switch members 316 which are connected to wires 317 of the strike control circuit. These switches are connected in series through all the pin resetters and two leads thereof are connected by means of nuts 342 in plate 334. Bracket 336 is clamped in such a manner by means of bolt 336a to shaft 39 that a plate 334 extends upwardly therefrom. Plate 328 is so mounted with respect to hub 92 of frame F that switches 329 and 340 engage with the contacts 332 and 341 on plate 334 whenever the pin resetters are located above the alley in position to determine the presence or absence of standing pins thereon. Consequently, when the table T is indexed and lowered towards the alley, circuits will be made through wires 323 and 317 because then switches 329 engage contacts 332 and switches 340 engage contacts 341. It will be seen, therefore, that as the table is moved upwardly and indexed another 180°, the several switches will be opened and the several circuits will be broken.

The leads 323 which are attached to plate 334 extend to plate 343 mounted on bracket 336. Plate 343 is made of non-conducting material having several contacts 344 which are engaged by spring switches 345 secured to plate 346 by means of bolts 347 and nuts 348. Leads 323 are similarly secured to plate 343. Plate 346 is mounted on a bracket 349 fixed to frame I. In this manner, despite the fact that carriage 371 mounts the shaft 39 for vertical movement, nevertheless the electric circuits can be made and maintained whenever switch 345 contacts 344 in lowered position of the pin setter table T.

SUCTION CONTROL MECHANISM OPERATION

Pins standing after throwing of each ball

Referring to Figures 4, 5, 6, 7 and 13, it will be apparent that there is a direct relationship between the several cams which function to control the machine when a strike or spare is made, or if pins remain standing on the alley after the throwing of the allotted number of balls, and the suction control means which coact with the suction valves controlling the supply of suction to the pin setters and resetters of the pin handling table.

If it be assumed that a set of pins is standing on the bowling alley in playing arrangement at the beginning of a game, then under normal conditions cams 141 and 144 of the cam assembly 147 will be positioned to engage with levers 121 and 121a for opening and closing the suction valves V₁ and V₂.

Referring to Figures 25, 26, 27 and 28, which show the several cams expanded, lever 121a engages cam 144 while lever 121 engages cam 141 and at the same time lever 195 tracks cam 186 and lever 267 runs on cam 189. When the first ball is thrown and pins remain standing, the table when lowered will bring the resetter units U into a position proximate the alley in order to test for standing pins, and since pins are found standing, the several levers and cams retain the relationship described above. Due to the continued rotation of the several cams when the respotters engage the standing pins, lever 121 rides on a high portion of cam 144 and suction goes on in order to grip the standing pins so that when the table is lifted, the standing pins will be picked up in order that "deadwood" may be removed from the alley by the sweep. The suction is maintained on until the table descends and respots the lifted pins on the alley in substantially their identical positions whereupon suction goes off because cam lever rides off the high portion of cam 144 and the pins are released.

Since cam 186 is engaging lever 195 in this particular phase of operation of the machine, the table indexing mechanism will remain inoperative during the movement of the table up and down because of the low portion engaged by lever 195. At the same time, suction valve control lever 121 will have no motion because it rides on the low part of cam 141 and hence no suction will be turned into the spotters. With the return of the standing pins to the alley in respotted positions and the elevation of the table with a concurrent rotation of the several cams through 180°, the first cycle of the machine will have been completed and hence it will be seen that for each ball thrown it will cause the machine to operate through an entire cycle.

If, upon the throwing of the next ball of the allowed number of balls per frame, pins still remain standing, the table T travels downwardly to the alley and finds pins remaining upright thereon. If the game being played as a two ball per frame game, the standing pins will not be relifted and respotted. Consequently, lever 121a rides on a dwell portion of cam 144 and no suction can be conducted to the respotting units U so that the pins will not be lifted. Hence, when the table rises the sweep will sweep the standing pins and "deadwood" into the pit. As the table rises, cam 189 engages lever 267 to set into operation the mechanism for feeding pins to the setters of the table and as the table reaches its upward limits, a new set of pins is placed in the setters, whereupon by means of cam 141 suction is created in the setter units S to hold the pins firmly while the pin transfers 42 retreat and return to their original positions. At the same time suction is turned on in the respotting units U because of the engagement of the lever 121a with a high portion of cam 144 which causes the resetters to be held against lateral movement for support on the table and thereby prevent them from shifting around during the indexing of the table which is caused by the engagement of bump 3a of cam 186 with lever 195 in order to position the pins for delivery on the alley. Therefore, with suction on in both setters and resetters, the table T with the pins in the setters S descends to the alley, the pins are located thereon, and due to the engagement of lever 121 with a low portion of cam 141, suction is cut off, the pins are freed and remain standing on the alley when the table rises. Suction, however, remains on in the respotters because the table must be again indexed through 180° in order to present the setters for another set of pins. The suction remains on until the table rises and is indexed by engagement of lever 195 with bump 4a of cam 186 whereupon lever 121a rides off the high portion of cam 144 and suction is cut off thereby closing the second cycle.

*Spare*

In a spare the same operations are carried out except that when the table is lowered to test for the presence or absence of standing pins after the throwing of the second ball of the allowed number per frame, a spare signal (not shown) will be energized to apprise the player of the status of his play. All of the several levers and cams described above operate similarly and the machine is in operation for two cycles.

*Strike*

At the conclusion of any cycle a new set of pins is placed on the alley bed and remain standing thereon. The several control levers are placed in position with cams 141, 144, 186 and 189, if therefore, when the first ball is thrown and all of the pins are knocked down a strike results.

The arrival of the ball in the pit at the end of the alley starts the operation of the machine and causes the table T to be lowered to perform its function of testing to determine the absence or presence of standing pins. The downward movement of table T causes switch members 345, 347 to close (Figures 35 and 39). At this time suction has been created in the several resetting devices and since no pins are found standing, the circuit 323 is closed because of the closing of the several contacts 320 by movement of pistons 301 in brackets 300 (see Figure 20), and if desired a strike signal can be used to inform the player that all pins have been knocked down by the first ball. The removal of all pins from the alley by a single ball causes the energization of solenoid 160 which unlatches one of the control pins 164 so that it engages cam surface 182 of lever 178 forcing the lever in a counter-clockwise direction (Figure 13) so that all of the cams 141, 144, 186 and 189 are shifted out of engagement with levers 121, 121a, 195 and 267 and cams 143, 146, 188 and 191 take their places. Table T is then elevated and because levers 121 and 121a engage low portion of cams 143 and 146, suction is cut off in both the setters S and resetters U during the elevation of the suction table to pin receiving position. Substantially simultaneously with the energization of solenoid 160 the pin setter control mechanism is activated to feed a new set of pins to the setters, and when the pins have been located in the setters S because of the engagement of levers 121 and 121a with high portions of cams 143 and 146, the pins are gripped in the setters by suction and the resetters U are held against lateral shifting during the indexing of the table because of the engagement of lever 195 with bump 1 of cam 188 which switches the pins from receiving to pin delivery position above the alley. The table is lowered with suction on in both setters and resetters and after the pins have been located on the alley, suction is cut off in the setters to free the pins on the alley because lever 121 rides onto a low portion of cam 143 and closes valve V₁.

Suction remains on in the resetters. The table T is elevated to its upper limits, and at that position lever 195 engages bump 2 of cam 188 and indexes the table to its original position with the pin setters located for receiving a new set of pins. Then, because of the movement of lever 121a, downwardly, as it travels off a high portion of cam 146, suction is cut off in valve V₂. During this series of operations, star wheel 255 has been moved because of its engagement with pin 164 when the strike was registered. This means that lever 260 has run off a high portion of cam 258 onto a low part thereof whereupon because of the coaction of projection 265 of lever 262 and pin 266 of lever 178, lever 178 is prevented from moving backward its entire stroke and is locked in intermediate position. This causes a shifting of cams of the several cam assemblies so that cams 143, 146, 188 and 191 are moved out of coaction with control levers 121, 121a, 195 and 267, respectively, and cams 142, 145, 187 and 190 are positioned for engaging these levers instead. This concludes one cycle of the machine and a one-half revolution (180°) turn of the several cams described. If on the next cycle a ball is thrown and another strike results, the table T will be lowered causing the machine to be set into operation by the arrival of the ball in the alley bed, suction will be on and circuit 317 closed, as above described. The fact that no pins are standing will be communicated to the player by suitable means (not shown) and certain elements of the machine will be set into operation as described above. Due to the engagement of the selected pin 164 with cam 182 of lever 178, the cam groups will again be shifted on shafts 117, 185 so that cams 143, 146, 188 and 199 will again be moved to engagement with levers 121, 121a, 195 and 267, respectively. The table is raised, the suction off, both in the setters and resetters, a new set of pins is placed in the setters whereupon valves V₁ and V₂ are opened by levers 121 and 121a riding on high portions of cams 143 and 146 so that pins are again held in the setters and the resetters are fixed against lateral movement of the table T which is turned and then lowered, pins are located on the alley bed, and the suction is cut off in valve V₁, freeing the pins, as described above, while suction remains on in the respotters. The table is then moved to its uppermost position, bump 4 of cam 188 is engaged by lever 195 to index the table to pin receiving position, suction is cut off in the resetters, and by means of spring 194 bearing against cam assembly 184 lever 178 is shifted to its full stroke which also shifts the several cams 141 and 144, 186 and 189 for engagement with levers 121, 121a, 195 and 265, respectively. This concludes the second cycle and the machine is set into operation as it was in the beginning of this description.

Figures 40, 41, 42 and 43 show diagrammatically the sequence of operations taking place in my machine depending upon whether a player makes a strike or a spare or completes the throwing of the allotted number of balls per frame with pins standing on the alley. According to Figure 40, the first ball has been thrown resulting in a strike or knocking down of all of the pins of the frame, guard 401 has been lowered, the pin setter table T (showing only diagrammatically among pin setters S and resetters U) has been moved down from position 1 to a point adjacent the alley and having found no pins standing has moved back up to position 2 where a new set of pins is placed in the setters S whereupon the table T is turned through 180°. Following the upward movement of the pin setter table, sweep 402 moves into operation and removes all "deadwood" from the alley, and the pins and/or balls are returned to storage M, and the player, respectively, by mechanism (not shown) which may take the form of that disclosed in co-pending application, Serial No. 260,901, filed March 10, 1939, by R. E. Rundell for Bowling pin setter, which mechanism operates in timed relationship, guard 401 and sweep 402. The table is then moved downwardly to locate new pins on the alley, relays them, moves upwardly to its uppermost position and turns through 180° again to relocate the setters in pin receiving position. Guard 401 and sweep 402 are moved clear of the alley and the machine is ready for further play. The several actions, above described, take place during one cycle of the machine.

Figure 41:
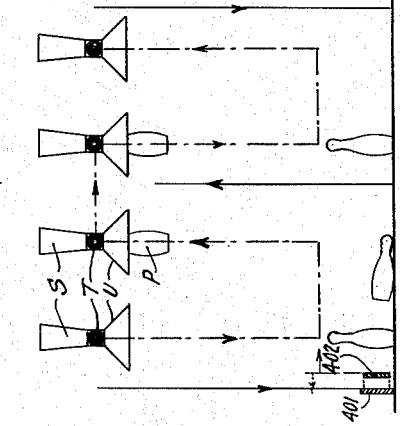
Figure 41 is a diagram showing the progressive operations after the first ball has failed to knock down all ten pins, not a strike.
Figure 40:
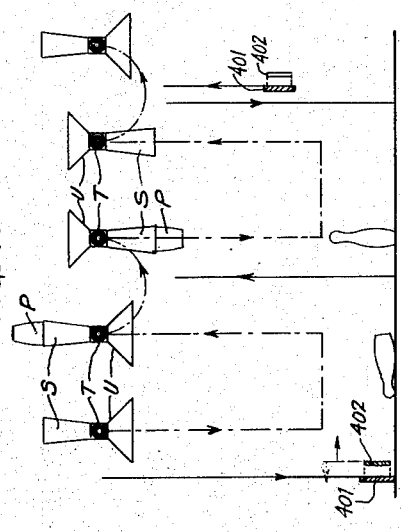
Figure 40 is a diagram showing the progressive operations after the first ball has knocked down all ten pins, resulting in a strike.

According to Figure 41 the first ball has been thrown and pins remain standing, whereupon when the table T is moved downwardly the standing pins are lifted, the guard 401 has been moved into position adjacent the alley prior to the lowering of the table, and after the standing pins have been raised above the alley, the sweep 402 removes all fallen pins or "deadwood" whereupon the pins to be respotted are replaced upon the alley because of the downward movement of the table and the cutting off of suction in the respotters U. The table with the respotters travels up, and guard 401 and sweep 402 are raised from the alley bed leaving the replaced pins standing on the alley.

In the second cycle, as shown in Figure 42, a spare is made because all the pins are knocked down by the second ball thrown along the alley bed. The arrival of the second ball on the pit elevator (see Figure 46) causes the sweep and rake to be lowered, the table T with respotters U again travels downwardly, tests for standing pins and finds none, and moves upwardly whereupon a new set of pins is placed in setters S. In the meantime sweep 402 has traveled along the alley bed and removed "deadwood" therefrom. The sweep then takes its inoperative position adjacent the guard 401, table T is indexed (as shown in Figure 42) to place the setters above the alley in proper position to deposit pins thereupon, the table travels down, suction is cut off, and the pins are left standing as the table travels upwardly. In its uppermost limits the indexing mechanism is again set into operation and the table is turned through 180° to relocate the setters to receive another set of pins when occasion demands. The guard 401 and rake 402 then travel upwardly to inoperative position, the second cycle concludes and the machine is ready for further play.

The second cycle of the machine, in such a case, is shown diagrammatically in Figure 42 wherein all of the remaining standing pins are felled by the second ball. The guard 401 is moved into its operative position, the table is lowered, and since there are no pins to be lifted, it moves back to its initial position above the alley, whereupon sweep 402 comes into operation to sweep the "deadwood" into the pit. A new set of pins is placed in the setters, the table is turned 180° to position the pins over the alley bed, whereupon it is lowered, the pins are released in playing arrangement, the table moves up and is turned through 180° to reposition the setters in receiving position. Following this the sweep and guard are raised and the cycle is concluded with a new set of pins arranged ready for further play. It will be seen, therefore, that the above description covers the operations of the machine whenever a spare has been made and it will be seen that two cycles are necessary.

Figure 43:
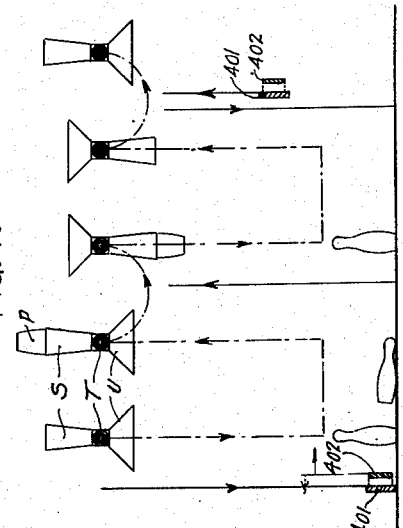
Figure 43 is a diagram showing the progressive operations after the second ball has failed to knock down all the pins left standing by the first ball, not a spare.

In the event that neither a strike nor a spare is made, there will be pins standing on the alley after the second ball has been thrown so that the second cycle of the machine will be as shown in Figure 43 in which guard 401 has been brought into adjacency with the alley bed, resetters U move into testing position with respect to standing pins, but since there is to be no further play with the standing pins, suction is not turned on in the resetters and they return to their uppermost position leaving the pins standing on the alley. Sweep 402 moves across the alley and sweeps all standing pins and "deadwood" therefrom into the pit. In the meantime a new set of pins has been fed to the setters, table T is turned through 180°, lowered, pins are arranged in playing position on the alley bed, suction in the setters is released to free the pins, the table ascends to its uppermost position and is indexed 180° to reposition the setters in pin receiving position whereupon sweep 402 and guard 401 are lifted clear of the alley and the machine is ready for a new cycle and further play.

ELECTRIC DIAGRAM

Figure 39 shows a suitable wiring diagram for operating the electric control of my invention. In this figure several switches 320 of the respotters which are connected in series in the circuit 323 are closed and hence it will be assumed that a strike has been made, that the table T has been lowered and suction has been directed through conduits 91 to move plungers 301 to close the switches 320 (Figure 20) and make the circuit 323. Current flows through sliding contacts 348 and 344 and 332 and 329 along the wire 361 to a relay 351 which is energized to close a switch 352, thereby passing current through a wire 362 to solenoid 160 whereupon armature 161 connected to lever 162 rocks the arm to locate cam face 162c in position to engage a latch 163 on turret 165 and unlock a strike control indexing pin 164. At substantially the same time current has passed through conduit 363 to wire 364 and relay 353 has been energized to close a switch 354 and pass current through a wire 365 to solenoid 355 which upon being energized causes armature 356 to rock lever 357 pivoted thereto out of the path of clutch control member 358 so that the clutch is thrown into operation by drive shaft 53 to effect the feed of a new set of pins P from storage M by means of pin carriages 45.

If it should happen that less than ten pins should be knocked down on the first ball the machine will continue its normal operation. Upon the throwing of the last ball of a frame, however, when the table T is moved downward and finds standing pins, or in the case of a spare, where all the pins are knocked down by the second ball a cam 190 on shaft 185 moves into engagement with lever 269 and nose 267 thereof engaging with a switch, breaks the circuit through wire 361 thereby de-energizing relay 351 and breaking the circuit through wire 362 to solenoid 160. At the same time switch 360 has closed the circuit through wire 366 and 364, thereby energizing relay 353 and causing switch 354 to again make circuit through wire 365 and energize solenoid 355 for the purposes described above.

The invention above described may be varied in construction within the scope of the claims, for the particular device, selected to illustrate the invention, is but one of many possible concrete embodiments of the same. It is not, therefore, to be restricted to the precise details of the structure shown and described.

What is claimed is:

1. In a bowling pin setting machine the combination with a carriage arranged to move to and from an alley, of a support on said carriage, a plurality of pin holding units mounted on said support, mechanism for moving said support to present said units for loading with pins and deliver said pins in playing arrangement on said alley bed, an indexing device for said carriage, said indexing device comprising a gear movable with said carriage, a stationary cooperating gear located to engage said first-named gear at the upper limit of travel of said carriage, and selective means operating in accordance with the number of pins felled by the first or second ball of a frame for rotating said stationary gear to index said support.

2. In a bowling pin setting machine, an alley bed, a movable support, bowling pin holders mounted on said support, bowling pin resetters also mounted on said support and facing in a different direction, means for raising and lowering said support to and from said alley bed, an indexing gear fastened to said support, a stationary indexing gear arranged to cooperate with said gear to turn said support at its uppermost position, and means operative to index said support when said gears are in meshing engagement.

3. In a bowling pin setting machine, an alley bed, a movable support, bowling pin handling device including pin holders and pin resetters mounted on said support, means for raising and lowering said support to and from said alley bed to set and reset pins thereon, an indexing member on said support, a second indexing member arranged to cooperate with said first-named member while said support is in its uppermost position, and devices operative to index said support when said members are in coacting relationship, said devices comprising a shaft, and control means slidable on said shaft; and mechanism responsive to the presence or absence of pins standing upon the alley bed resulting from the throwing of the first ball down said alley and the removal of all of the pins therefrom or the throwing of a first and second ball down said alley, and the removal of all standing pins therefrom for selecting one of said means to index said support.

4. In a bowling pin setting machine, an alley bed, a support, bowling pin setters mounted on said support, means for moving said support to and from the alley bed, and mechanism for turning said support prior to movement towards said bed to locate pins held by said setters above said bed, said mechanism comprising a stationary indexing device, a cooperating indexing device mounted on said support, and arranged to engage with said first-named device prior to the movement of said support towards said bed, means operative to drive said index devices when they are in coacting engagement, and control means made operative by the presence or absence of pins resulting from throwing of balls over said bed for setting said devices for operation.

5. In a bowling pin setting machine, a turnably mounted support, a plurality of pin holders for holding pins in substantial playing arrangement mounted on said support, means for placing pins in said holders, means for indexing said support while said support is adjacent said pin placing means to transfer said pins from receiving position to deliver pins above an alley bed, means for lowering said support to deliver said pins in playing positions on said support, means for raising said support, and means operative when said support has been raised for turning said support in the same angular direction to again locate said pin holders in position to receive pins.

6. Control mechanism for a bowling pin setting machine comprising, a vertically movable turnable pin support, an alley bed located beneath said support holding thereon a plurality of pins in playing arrangement, means for moving said support to and from said bed, mechanism coacting with said support for indexing the same to locate pins for delivery upon said alley bed, said mechanism including means for controlling the turning movement of said support, a control turret, and means carried by said turret for operating said mechanism whenever all of said pins are felled by the first ball of a frame.

7. In a bowling pin setting machine the combination with an alley bed, of a pin conveyor movable to and from said bed for setting and resetting pins thereon, bowling pin handling units carried by said conveyor, mechanism for cyclically turning said support to deliver pins carried thereby to said bed, and control means associated with said units for preventing turning of said support whenever less than a full set of standing pins is felled by the first thrown ball.

8. In a bowling pin setting machine the combination with an alley bed, of a pin conveyor movable to and from said bed for setting and resetting pins thereon, bowling pin handling units carried by said conveyor, mechanism for cyclically turning said support to deliver pins carried thereby to said bed, control means associated with said units for preventing turning of said support whenever less than a full set of standing pins is felled by the first thrown ball, said control means including an indexing device, a rotary driving means for operating said device, and means for selectively positioning said driving means for coaction with said indexing device.

9. In a bowling pin setting machine the combination with an alley bed having means thereon for locating pins in playing arrangement, of a carriage, a support rotatably mounted on said carriage for movement in a single direction, pin setters mounted on said carriage, resetter devices also carried by said carriage, a guide for said carriage, indexing mechanism for said support positioned above said bed, means mounted on said support and arranged to engage with said indexing mechanism when said carriage is raised to its upper limits, and means associated with said resetter devices and operative when said carriage has been moved to its lowest limits for setting said mechanism for indexing said support.

10. In a bowling pin setting machine the combination with an alley bed having means thereon for locating pins in playing arrangement, of a carriage, a support mounted on said carriage, pin setters mounted on said carriage, resetter devices also carried by said carriage, a guide for said carriage, indexing mechanism for said support positioned above said bed, means mounted on said support and arranged to engage with said indexing mechanism when said carriage is raised to its upper limits for turning said support, means associated with said resetter devices and operative when said carriage has been moved to its lowest limits for setting said mechanism to index said support, and means for effecting intermittent rotation of said support in a single direction only to and from pin receiving position and delivery position above said bed.

11. Control mechanism for a bowling pin setting machine comprising, a movable pin handling member, a plurality of bowling pin holding means mounted on said member, an alley bed, means for moving said member to and from said alley bed to set pins thereon, mechanism controlling the movement of said member to and from said bed including, a control element, a latch holding said element in inoperative position, and means actuated in response to the movement of said element when all standing pins of a frame have been knocked down by a single ball for freeing said latch.

12. In a bowling pin setting apparatus the combination with an alley, of a movable support, a plurality of pin holders, means mounting said holders on said support in substantial playing position, means for moving said support to and from pin receiving position and pin discharging position on said alley, and selectively operated means controlling the indexing of said support in a single angular direction prior to movement of said support towards said alley, dependent upon the number of pins knocked down by a ball thrown over said alley.

13. In a bowling pin setting apparatus the combination with an alley, of a movable support, a plurality of pin holders mounted on said support, means for moving said support to and from pin receiving position and pin discharging position on said alley, means for indexing said support in a single angular direction, and selectively operated means for operating said indexing means prior to movement of said support towards said alley.

14. In a bowling pin setting machine the combination with an alley bed, of means for placing bowling pins on said bed in playing arrangement, said means comprising an elevator, pin handling units mounted on said elevator, means for raising, lowering and turning said elevator to cause said units to set and reset pins on said bed, means associated with said units for determining the presence or absence of pins on said bed after the throwing of a ball, means for controlling the feed of a new set of pins to said bed comprising strike control mechanism, spare control mechanism, an elevator motion control element, selective cams coacting with said device, and means operative in response to the number of pins knocked down by the first or second ball of a frame for causing relative movement between said element and cams to cause the operation of one of said mechanisms.

15. In a bowling pin setting machine, mechanism responsive to the presence or absence of pins standing on the alley as a result of the rolling of the first ball of a frame and the removal of all of the standing pins of a frame to set a new frame of pins, said mechanisms including a control device, a shaft, a movable support mounted on said shaft, a plurality of control members mounted in said support, means normally holding said members in inoperative position, means rendered operative by the removal of all of the pins to release one of said members, a control element positioned in the path of said member and engageable thereby during the movement of said support for moving said control device, and means associated with said device and movable thereby for operating said mechanism.

16. In a bowling pin setting machine, the combination with an alley bed and a device for setting pins on said alley bed in playing arrangement, of means responsive to the presence or absence of pins standing on the alley as a result of the rolling of the first ball and the removal of all pins thereby for placing a new set of pins on said bed to begin another frame, said means including means for feeding a set of pins to said device, means for moving said device with said pins from receiving to discharge position relative to said alley bed, a movable member, a shaft, a plurality of control cams slidably mounted on said shaft, and means engaging said member to select one of said cams for effecting the movement of said device from receiving to said discharge position.

17. In a bowling pin setting machine, a bowling pin alley, a rotatable support, bowling pin holders mounted on said support, means for turning said support from pin receiving to pin discharging position relative to said alley, means for moving said support towards said alley after the throwing of a ball to determine the presence or absence of pins standing thereon, control means rendered operative by the absence of standing pins on said alley after the throwing of the first ball for setting said table for turning, including a shaft, a turret mounted on said shaft, a control member carried by said turret, means normally holding said control member inoperative, and means rendered operative by the removal of all said pins for releasing said control member.

18. Control mechanism for effecting the placing of pins on the bed of a bowling alley when all the pins of one frame have been removed by a single ball comprising, a shaft, a turret mounted on said shaft, driving means for rotating said turret, a plurality of control members mounted in spaced relation in said turret, means for normally holding said control members inoperative, and means rendered operative by the removal of all pins for releasing one of said members.

19. Control mechanism for an automatic bowling pin setting machine for effecting the placing of pins in the bed of a bowling alley comprising, a shaft, a turret mounted on said shaft, driving means for rotating said shaft, a plurality of control members mounted in spaced relation on said turret, latches normally holding said members inoperative, a device made operative when all pins have been knocked down by a single ball for tripping one of said latches to release a control member, a cam positioned to engage said control member, an element shifted by said cam, and a plurality of cams coacting with said element for effecting the feed of a new set of pins to said alley.

20. Control mechanism for effecting the placing of pins on the bed of a bowling alley when all the pins of one frame have been removed by a single ball comprising, a control member, a latch normally locking said member in control position, an electric circuit, a trip, means associated with said circuit and arranged to engage said latch, means for energizing said circuit to cause said trip to unlatch said member, a control element operated by said member, and means associated with said control element for effecting the feed of a new set of pins to said alley.

21. Control mechanism for effecting the placing of pins on the bed of a bowling alley following the rolling of one or all balls allotted for a frame and dependent upon the number of pins knocked down by a ball comprising, a rotatable device for placing pins on an alley, means for locking said device against rotary movement, means operative after the removal of all pins by a single ball for effecting the rotation of said device to locate a new set of pins for delivery to said alley, and other means operative if less than a full set of pins is knocked down by a single ball for preventing turning movement of said devices until the last ball has been thrown.

22. Mechanism for effecting the automatic feed of a set of bowling pins to the bed of a bowling alley comprising, a control member, a normally inoperative control element, a control arm, a plurality of control devices arranged to coact with said arm, means made operative by the removal of all standing pins of a set by the first ball, of a frame for activating said member, and connections between said arm and devices for causing relative movement between said arm and devices.

23. Mechanism for effecting the feed of bowling pins to the bed of a bowling alley comprising, a control member, a control element, a latch normally locking said element in inoperative position, a movable control arm, a plurality of control devices arranged to cooperate with said arm, means made operative by the throwing of the first ball of a frame and the removal of all standing pins of a set for moving said member to unlock said latch and render said element operative, and means engaged by said element for causing relative movement between said arm and devices.

24. Mechanism for feeding a set of pins to the bed of a bowling alley, a control element, locking means normally holding said element in inoperative position, a movable control arm, a plurality of cams arranged to cooperate with said arm, means responsive to the removal of all pins of a set standing on said alley on the throwing of the first ball of a frame for unlocking said element, means for moving said element to operative position, and means engaged by said element for causing relative movement between said arm and cams.

25. Mechanism for feeding a set of pins to the bed of a bowling alley, a control element, locking means normally holding said element in inoperative position, a movable control arm, a plurality of cams arranged to cooperate with said arm, means responsive to the removal of all pins of a set standing on said alley on the throwing of the first ball of a frame for unlocking said element, means for moving said element to operative position, a control member arranged to be engaged by said element for causing relative movement between said arm and cams, a toothed device also engaged by said element, and means on said member and associated with said device for limiting the movement of said member in one direction of its movement.

26. Control mechanism for a bowling pin setting machine comprising, a normally inactive arm, a movable supporting member, a control element mounted on said member, a control lever, and means responsive to the knocking down of all standing pins by the first ball thrown for actuating said arm and element for moving said control lever.

27. Control mechanism for a bowling pin setting machine comprising, a normally inactive arm, a movable supporting member, a control element mounted on said member, a control lever, a star wheel positioned to be engaged by said element, and means responsive to the knocking down of all the pins by the first ball thrown for actuating said element and positioning it to engage said lever, and also turn said star wheel.

28. Control mechanism for a bowling pin setting machine comprising, a normally inactive arm, a movable supporting member, a control element mounted on said member, a control lever, means responsive to the knocking down of all standing pins by the first ball thrown for actuating said arm and element for moving said control lever, a star wheel associated with said element and intermittently turned thereby, a cam cooperating with said star-wheel, and means for moving said support and cause said element to displace said lever and turn said star wheel and cam.

29. Control mechanism for a bowling pin setting machine comprising, a normally inactive arm, a movable supporting member, a control element mounted on said member, a control lever, means resposive to the knocking down of all standing pins by the first ball thrown for actuating said arm and element for moving said control lever, a star wheel associated with said element and intermittently turned thereby, a cam cooperating with said star weel, a stop device on said lever, means responsive to the knocking down of all pins by a single ball for rocking said lever and turning said star wheel and cam, said cam being provided with a plurality of high and low portions, and means for engaging said stop device on said lever and interrupting a part of the return motion of said lever.

30. Control mechanism for a bowling pin setting machine comprising, an arm, a movable supporting member, a control element mounted on said member, a control lever, means responsive to the knocking down of all standing pins by the first ball thrown for actuating said arm and element for moving said control lever, a star wheel associated with said element and intermittently turned thereby, a cam cooperating with said star wheel, a stop device on said lever, means responsive to the knocking down of all pins by a single ball for rocking said lever and turning said star wheel and cam, said cam being provided with a plurality of high and low portions, means for engaging said stop device on said lever and interrupting a part of the return motion of said lever, and mechanism coacting with said star wheel to lock it against accidental displacement.

31. Mechanism for setting bowling pins on the bed of a bowling alley after the throwing of the first ball of a frame and the removal of all pins thereby comprising, a movable supporting member, a control pin carried by said member, a latch holding said pin in inoperative position in said member, and means rendered operative by the removal of all pins standing on said alley by a thrown ball for unlocking said pin, and means for moving said pin into operative position relative to said member.

32. In a bowling pin setting machine, the combination with an alley bed having positioned thereon a plurality of pins in playing arrangement, of control mechanism for effecting the replacement of said pins upon the removal of all of the pins upon the rolling of the first ball of a frame including, a movable support member, control elements carried by said member, latches locking said elements in inoperative position in said member, a latch trip, means for moving said trip after the throwing of a ball for releasing one of said elements, and means for projecting said released element into operative position.

33. Control mechanism for a bowling alley comprising a shaft, a turret mounted on said shaft, a gear associated with said turret, a driving gear coacting with said first-named gear to rotate said turret, a plurality of control members mounted in spaced position on said turret, latches normally holding said members in inoperative position, a lever positioned to engage said latches, a solenoid connected to said lever, an electric circuit for said solenoid, and means for energizing said solenoid whenever all of said pins have been removed from said alley by a single ball for releasing one of said control members, and means associated with each of said members for moving it into operative position following its release from said latch.

34. A control mechanism for controlling the feeding of pins to a bowling alley, comprising an elevator movable to and from said alley, a control turret, pins slidably mounted in said turret, latches normally holding said pins in inoperative position relative to said turret, a lever, a cam mounted on said lever, means made operative after the throwing of a single ball of a frame and knocking down of all pins thereof for releasing one of said pins to engage said cam and rock said lever, a second lever coacting with said first named lever, a set of cams shiftable by said last named lever, an index lever positioned to engage a selected cam of said cam set, means for rocking said index lever, and means set into operation by the movement of said lever to unlock said index for feeding a new frame of pins to the alley.

35. In a bowling pin setting machine having a storage magazine, a pin handling device for setting and resetting pins on an alley, and means for transferring pins from said magazine to said device, control mechanism for selectively operating said device to set and reset pins on an alley comprising, a mechanism responsive when all pins are knocked down by a single ball of a frame, another mechanism responsive when all pins are knocked down by the second thrown ball, a shiftable common cam member associated with said last-named mechanisms, and selective means for shifting said cam for operation with the mechanism selected as the result of the number of pins felled by a particular ball.

36. A bowling pin setting machine comprising, a pin handling table provided with pin setting and resetting devices, means mounting said table for movement to and from pin setting position, means for turning said table to position said table for setting and resetting pins, control mechanism for causing said table to set a new frame of pins if all standing pins are knocked down by a single ball, control mechanism operative to reset pins remaining standing after the throwing of the first ball and to set a new set of pins after the throwing of the last ball allotted for each frame, a common movable control element coacting with each of said mechanisms, and means for selectively moving said element depending on the number of pins felled by each ball thrown.

37. Strike control mechanism for a bowling pin setting machine comprising, a shaft, a turret mounted on said shaft, a lever, cam means mounted on said lever, control elements carried by said turret and adapted to engage said cam means, and means for positioning said elements for engagement with said cam means whenever a strike is made.

38. Strike control mechanism for a bowling pin setting machine comprising, a control element, a strike control lever, means mounting said lever for selective engagement with said element, and means responsive to the removal of all standing pins of a frame by the first ball thrown for effecting relative movement between said element and said lever.

39. In a bowling machine, control mechanism for differentiating between strikes and spares for feeding pins for setting on the bed of a bowling alley comprising, a device for determining the presence or absence of pins on said alley, a control means rendered operative by the absence of pins on said alley, a movable member, a yoke formed on said movable member, a lever coacting thereby with said yoke, a shaft, a plurality of cams slidably mounted on said shaft, means operated by the movement of said lever for shifting said cams along said shaft, and a control member arranged to engage said cams to effect the feed of pins to said alley bed whenever a new set is needed thereon.

40. Strike control mechanism for a bowling pin setting machine comprising, a normally inoperative control member, a lever, cam means mounted on said lever, means for rendering said member operative whenever all the pins standing on a bowling alley bed are knocked down by a single ball, and means for positioning said member to engage said cam means whenever a strike is made to effect the feed of a new set of pins to said bed.

41. Control mechanism for a bowling pin setting machine comprising, a shaft, a turret mounted on said shaft, a lever, means for holding said lever in a position of rest, cam means associated with said lever, control elements carried by said turret and adapted to engage said cam means, means for positioning one of said elements for engagement with said cam means to move said lever from said position of rest whenever a strike is made, a star wheel provided with a series of projections also located for engagement by said element, and a cam coacting with said star wheel and limiting the return movement of said lever to said first position of rest.

42. A bowling pin setting machine comprising, a carriage, a support turnably mounted on said carriage, pin handling means mounted on said support, a source of supply of bowling pins, means for indexing said support on said carriage, means for conveying bowling pins from said source of supply to said pin handling means, means for locking said indexing means during the delivery of pins to said handling means, control means operative upon the throwing of a ball and the removal of any or all of the pins standing on the alley for unlocking said index and instituting the operation of the machine to transfer said pins from receiving to discharge position on the bed of an alley.

43. Bowling pin handling mechanism comprising a hollow shaft, a frame mounted on said shaft for movement relative thereto, a plurality of bowling pin handling devices, means mounting said devices on said frame to hold pins in substantial playing arrangement for setting and resetting bowling pins in playing positions upon the bed of a bowling alley, suction conduits connecting said hollow shaft with said devices, selectively operated means for conducting suction to said hollow shaft for selective distribution through said conduits to said setter or resetter devices, and means mounted on said shaft and secured to said frame for effecting relative movement between said shaft and frame.

44. In a pin handling mechanism for bowling pin setting machines, the combination with a hollow shaft, of a frame turnably mounted on said shaft, means rotatable on said shaft and fixed to said frame for turning said frame in a single direction only, a plurality of bowling pin handling devices, means mounting said devices on said frame to hold pins in substantial playing arrangement, means for conducting suction through said shaft to some of said devices, and separate means formed in said shaft for conducting suction to others of said devices.

45. Bowling pin handling mechanism for a bowling pin setting machine comprising, a hollow shaft, carriages mounted at the ends of said shaft, slides mounting said carriages for vertical movement to and from the bed of a bowling alley for setting and resetting pins thereon in playing arrangement, a frame mounted on said shaft for turning movement thereon in a single angular direction, bowling pin handling devices mounted on said frame, suction conduits connecting said handling devices, pipes connecting said conduits, selectively controlled means for conducting suction through said hollow shaft to some of said devices, and a conduit located within said shaft and under control of said last-named means for conducting suction to others of said devices.

46. A bowling pin setting machine comprising, an alley, a frame, a plurality of suction operated pin setters, and resetters mounted on said frame, means for raising, lowering and turning said frame to set and reset pins on said alley, suction cam control means for controlling the passage of suction to said setters and resetters, cam control mechanism actuated in response to the number of pins knocked down by the first or second ball of a frame for furnishing a new set of pins or resetting standing pins, and connections between said control means and mechanism for effecting timed operation of said control means and mechanism.

47. In a bowling pin setting machine for a bowling alley, the combination with a frame, of a plurality of pin setters mounted on one side of said frame, and a plurality of pin resetters mounted on the other side of said frame and facing in an opposite direction, suction conduits connecting each of said setters and resetters, suction control valves for said setters and said resetters, means for moving said frame to and from said alley, means for turning said frame to move said setters from pin receiving position to pin delivery position over said alley, control mechanism responsive to the number of pins felled by a first or second ball of a frame for effecting the turning movement of said frame, and means associated with said mechanism for controlling the operation of said valves during the movement of said frame.

48. Bowling pin setting mechanism for a bowling pin setting machine comprising, a a hollow shaft, a slidable carriage connected to said shaft, means for guiding said carriage for vertical movement to and from an alley bed, a support turnably mounted on said shaft for rotation in a single angular direction, bowling pin setting devices projecting from one side of said support, bowling pin resetters projecting from the opposite side of said support, suction conduits connecting said devices and said resetters, means for conducting suction to said conduits, means for moving said carriage to and from said alley bed, valves in said hollow shaft connecting with said setter and resetter conduits at different angular positions occupied by said support in setting and resetting pins, control valves for governing the introduction of suction into said conduits, through said first-named valves, and selectively operated control means associated with each of said resetters for selectively operating said control valves.

49. In a bowling pin setting machine the combination with an alley bed, of a device for placing bowling pins on said bed in playing arrangement, said device comprising a turnable elevator, a plurality of bowling pin setters mounted in generally triangular arrangement on one side of said elevator, a plurality of bowling pin resetters mounted in generally triangular arrangement on the other side of said elevator, means for moving said elevator to and from said alley bed, selectively operated mechanism for controlling the movement of said elevator towards and from said bed including, means for locating said elevator with said pin setters in pin receiving position at one limit of movement of said elevator when all pins are knocked down by the first ball thrown, means for turning said elevator with said pins held in said setters prior to the movement of said elevator towards said alley, means operative when said elevator is lowered to deliver pins in playing arrangement on said alley bed, and means operative when said elevator has been returned to its pin receiving position for turning the same to restore said pin setters to pin receiving position; said mechanism also including means for locking said elevator against turning in said pin receiving position whenever less than ten pins are knocked down by the first ball of a frame, means for energizing said resetters to lift and reset any standing pins preparatory to the throwing of the next ball, and other selectively operated mechanism operative after the last ball of a given frame has been thrown for turning said elevator with a new set of pins in said setters for delivery to said alley bed.

PETER M. NEJEDLY.